(12) United States Patent
Timmons

(10) Patent No.: US 12,289,243 B2
(45) Date of Patent: Apr. 29, 2025

(54) NETWORK POLICY APPLICATION BASED ON SESSION STATE

(71) Applicant: Juniper Networks, Inc., Sunnyvale, CA (US)

(72) Inventor: Patrick Timmons, Newton, MA (US)

(73) Assignee: Juniper Networks, Inc., Sunnyvale, CA (US)

(*) Notice: Subject to any disclaimer, the term of this patent is extended or adjusted under 35 U.S.C. 154(b) by 362 days.

(21) Appl. No.: 17/454,071

(22) Filed: Nov. 9, 2021

(65) Prior Publication Data

US 2022/0200915 A1 Jun. 23, 2022

Related U.S. Application Data

(60) Provisional application No. 63/128,672, filed on Dec. 21, 2020.

(51) Int. Cl.
*H04L 67/14* (2022.01)
*H04L 47/2475* (2022.01)

(52) U.S. Cl.
CPC .......... *H04L 47/2475* (2013.01); *H04L 67/14* (2013.01)

(58) Field of Classification Search
CPC .... H04L 47/2475; H04L 67/14; H04W 40/02; H04W 28/02
See application file for complete search history.

(56) References Cited

U.S. PATENT DOCUMENTS

| | | | |
|---|---|---|---|
| 8,499,095 B1 | 7/2013 | Sullenberger et al. | |
| 8,706,883 B2 | 4/2014 | Aggarwal et al. | |
| 8,737,198 B1 | 5/2014 | Holness et al. | |
| 9,252,972 B1* | 2/2016 | Dukes | H04L 49/70 |
| 9,729,439 B2 | 8/2017 | MeLampy et al. | |
| 9,729,682 B2 | 8/2017 | Kumar et al. | |
| 9,762,485 B2 | 9/2017 | Kaplan et al. | |

(Continued)

FOREIGN PATENT DOCUMENTS

| | | |
|---|---|---|
| EP | 3690649 A1 | 8/2020 |
| JP | 2020167469 A * | 10/2020 |

OTHER PUBLICATIONS

U.S. Appl. No. 17/446,601, entitled "Identifying Root Cause of Failures Through Detection of Network Scope Failures," Juniper Networks, Inc. (inventor: Cheng et al.) filed Aug. 31, 2021.

(Continued)

*Primary Examiner* — Eyob Hagos
(74) *Attorney, Agent, or Firm* — Shumaker & Sieffert, P.A.

(57) ABSTRACT

Techniques are disclosed for the detection of different states of a session comprising a bidirectional flow of network traffic between client devices so as to enable a network device to apply different network policies to different states of the session. In one example, a computing device identifies multiple states of a session and defines a plurality of network policies. Each network policy defines performance requirements for network traffic during each state of the session. A network device receives the plurality of network policies and determines a state of the session. The network device selects a path based on the performance requirements of the network policy associated with the determined state of the session. The network device forwards traffic associated with the session along the selected path while the session is in the determined state.

20 Claims, 4 Drawing Sheets

(56) References Cited

U.S. PATENT DOCUMENTS

| | | |
|---|---|---|
| 9,871,748 B2 | 1/2018 | Gosselin et al. |
| 9,985,883 B2 | 5/2018 | MeLampy et al. |
| 10,027,768 B2 | 7/2018 | Rao |
| 10,142,126 B2 | 11/2018 | Venugopal et al. |
| 10,200,264 B2 | 2/2019 | Menon et al. |
| 10,257,061 B2 | 4/2019 | Menon et al. |
| 10,277,506 B2 | 4/2019 | Timmons et al. |
| 10,341,140 B2 | 7/2019 | Shen et al. |
| 10,355,989 B1 | 7/2019 | Panchal et al. |
| 10,425,511 B2 | 9/2019 | McCulley et al. |
| 10,432,519 B2 | 10/2019 | Baj et al. |
| 10,432,522 B2 | 10/2019 | Kaplan et al. |
| 10,602,422 B1* | 3/2020 | Jagannatha ......... H04L 41/5041 |
| 10,841,206 B2 | 11/2020 | Menon et al. |
| 11,165,863 B1 | 11/2021 | Timmons et al. |
| 11,223,538 B1* | 1/2022 | Arumugam ............. H04L 45/26 |
| 11,252,126 B1 | 2/2022 | Thunga et al. |
| 11,429,463 B2 | 8/2022 | Graham |
| 11,438,255 B2 | 9/2022 | Tillotson et al. |
| 11,582,144 B2 | 2/2023 | Ramaswamy et al. |
| 11,972,134 B2 | 4/2024 | Irwin et al. |
| 11,973,686 B1 | 4/2024 | Panchal et al. |
| 2005/0025069 A1 | 2/2005 | Aysan |
| 2006/0236370 A1* | 10/2006 | John ....................... H04L 61/00 726/1 |
| 2009/0097417 A1 | 4/2009 | Asati et al. |
| 2009/0154341 A1* | 6/2009 | Bhupalam ........... H04L 41/0846 370/219 |
| 2010/0246602 A1 | 9/2010 | Barreto et al. |
| 2011/0069685 A1* | 3/2011 | Tofighbakhsh ..... H04L 43/0858 370/235 |
| 2013/0114482 A1* | 5/2013 | Oh ........................ H04W 80/00 370/310 |
| 2015/0092551 A1* | 4/2015 | Moisand ............... H04L 67/146 370/235 |
| 2016/0080195 A1* | 3/2016 | Ramachandran ... H04L 12/4633 370/220 |
| 2016/0337193 A1 | 11/2016 | Rao |
| 2016/0373341 A1 | 12/2016 | Venugopal et al. |
| 2017/0026417 A1 | 1/2017 | Ermagan et al. |
| 2017/0078410 A1 | 3/2017 | Rao |
| 2017/0346722 A1 | 11/2017 | Smith et al. |
| 2017/0366618 A1* | 12/2017 | Vrzic .................... H04L 67/148 |
| 2018/0367445 A1* | 12/2018 | Bajaj ...................... H04L 41/40 |
| 2019/0260657 A1 | 8/2019 | Filsfils et al. |
| 2019/0312914 A1 | 10/2019 | Cohn |
| 2020/0252458 A1 | 8/2020 | Ramamoorthi et al. |
| 2020/0366589 A1 | 11/2020 | Kaplan et al. |
| 2020/0366590 A1 | 11/2020 | Kaplan et al. |
| 2020/0366598 A1 | 11/2020 | Kaplan et al. |
| 2020/0366599 A1 | 11/2020 | Kaplan et al. |
| 2020/0382471 A1 | 12/2020 | Janakiraman et al. |
| 2020/0403890 A1 | 12/2020 | McCulley et al. |
| 2021/0036953 A1 | 2/2021 | Menon et al. |
| 2021/0328889 A1 | 10/2021 | McCulley et al. |
| 2022/0006756 A1 | 1/2022 | Ramaswamy et al. |
| 2022/0070092 A1* | 3/2022 | MeLampy ............. H04L 45/66 |
| 2022/0078046 A1 | 3/2022 | Wang et al. |
| 2022/0086062 A1 | 3/2022 | Gutierrez Estevez |
| 2022/0103471 A1 | 3/2022 | Kulkarni et al. |
| 2022/0138081 A1* | 5/2022 | Varma ................. G06F 11/3684 717/124 |
| 2022/0294725 A1 | 9/2022 | Vasseur et al. |
| 2022/0311695 A1 | 9/2022 | Kaciulis et al. |
| 2022/0329563 A1 | 10/2022 | Yeh et al. |
| 2023/0034314 A1 | 2/2023 | Brissette et al. |
| 2023/0059537 A1 | 2/2023 | Gavand et al. |
| 2023/0246930 A1 | 8/2023 | McCulley et al. |
| 2024/0064099 A1 | 2/2024 | Pang et al. |

OTHER PUBLICATIONS

"Transmission Control Protocol," Darpa Internet Program Protocol Specification, Information Sciences Institute, RFC 793, Sep. 1981, 91 pp.

Dierks et al., "The Transport Layer Security (TLS) Protocol Version 1.2," Network Working Group, RFC 5246, Aug. 2008, 105 pp.

Rescorla, "The Transport Layer Security (TLS) Protocol Version 1.3," Internet Engineering Task Force (IETF), RFC 8446, Aug. 2018, 160 pp.

Postel, " User Datagram Protocol," RFC 768, Aug. 28, 1980, 3 pp.

Menon et al. "Secure Vector Reouting (SVR)," draft-menon-svr-00, Network Working Group, Internet-Draft, Oct. 1, 2021, 38 pp.

Katz et al., "Bidirectional Forwarding Detection (BFD)," RFC 5880, Internet Engineering Task Force, Jun. 2010, 49 pp.

U.S. Appl. No. 17/449,618, entitled "Metric-Based Multi-Hop Path Selection," Juniper Networks, Inc. (inventor: Menon et al.) and filed Sep. 30, 2021.

Response to Extended Search Report dated May 30, 2022, from counterpart European Application No. 21215581.6 filed Dec. 22, 2022, 22 pp.

"Cisco Dynamic Multipoint VPN: Simple and Secure Branch-to-Branch Communications Data Sheet," Cisco Systems, Inc., Retrieved from: https://www.cisco.com/c/en/us/products/collateral/security/dynamic-multipoint-vpn-dmvpn/data_sheet_c78-468520.html, Jul. 25, 2017, 7 pp.

Anonymous, "Cisco SD-WAN Dynamic on-demand Tunnel Feature—The Network DNA", Aug. 31, 2021, 4 pp., Retrieved from the Internet: URL:https://www.thenetworkdna.com/2021/08/cisco-sd-wan-dynamic-on-demand-tunnel.html.

Cisco, "Dynamic On-Demand Tunnels", Aug. 20, 2020, 10 pp., Retrieved from the Internet: URL:https://www.cisco.com/c/en/us/td/docs/routers/sdwan/configuration/system-interface/ios-xe-17/systems-interfaces-book-xe-sdwan/m-dynamic-on-demand-tunnels.pdf.

Extended Search Report from counterpart European Application No. 21215581.6 dated May 30, 2022, 9 pp.

Guha et al., "NAT Behavioral Requirements for TCP," Network Working Group, RFC 5382, Oct. 2008, 21 pp.

Keranen et al., "Interactive Connectivity Establishment (ICE): A Protocol for Network Address Translator (NAT) Traversal," IETF, RFC 8445, Jul. 2018, 100 pp.

U.S. Appl. No. 17/449,311, filed Sep. 9, 2021, naming inventors Scholz et al.

Communication pursuant to Article 94(3) EPC from counterpart European Application No. 21215581.6 dated Nov. 6, 2024, 6 pp.

Response to Communication pursuant to Article 94(3) EPC dated Nov. 6, 2024, from counterpart European Application No. 21215581.6 filed Mar. 3, 2025, p. 24.

* cited by examiner

NETWORK POLICY APPLICATION BASED ON SESSION STATE

This application claims the benefit of U.S. Provisional Application No. 63/128,672, filed Dec. 21, 2020, the entire content of which is herein incorporated by reference in its entirety.

TECHNICAL FIELD

This disclosure generally relates to computer networks, and, more specifically, routing packets within computer networks.

BACKGROUND

A computer network is a collection of interconnected computing devices that can exchange data and share resources. Example computing devices include routers, switches, and other Layer 2 (L2) network devices that operate within Layer 2 of the Open Systems Interconnection (OSI) reference model, i.e., the data link layer, and Layer 3 (L3) network devices that operate within Layer 3 of the OSI reference model, i.e., the network layer. Network devices within computer networks often include a control unit that provides control plane functionality for the network device and forwarding components for routing or switching data units.

The computing devices may establish a "network session" (also referred to herein as "session") to enable communication between devices on a computer network. A session may be bidirectional in that the session includes packets traveling in both directions between a first device and a second device. For example, a session includes a forward packet flow originating from a first device and destinated for a second device and a reverse packet flow originating from the second device and destined for the first device. The forward and reverse packet flows of the session are related to one another in that the source address and source port of the forward packet flow is the same as the destination address and destination port of the reverse packet flow, and the destination address and destination port of the forward packet flow is the same as the source address and source port of the reverse packet flow. To establish a session, computing devices may use one or more communication session protocols including Transmission Control Protocol (TCP), Transport Layer Security (TLS), User Datagram Protocol (UDP), Internet Control Message Protocol (ICMP), etc.

SUMMARY

Techniques are disclosed for the detection of different states of a session comprising a bidirectional flow of network traffic between client devices and the generation of a different network policy for each state of the session. A network device as described herein may select a network path for network traffic associated with each state of the session based on the network policy corresponding to the state of the session.

In one example, a centralized controller, such as an orchestrator or Software-defined Networking (SDN) controller, identifies multiple states of a session, the session comprising a bidirectional flow of network traffic. For example, the centralized controller identifies the multiple states of a session by examining the behavior of the bidirectional flow of network traffic associated with a session over a period of time. In examples, the centralized controller examines the behavior of the session over a lifetime of the session (e.g., from establishment to termination of the session). In some examples, the multiple states include a session establishment state (wherein the session is established between two client devices), a data communication state (wherein data is exchanged between the two client devices), and a teardown state (wherein the data exchange is complete and the two client devices terminate the session). Additionally, the centralized controller generates network policies, each network policy corresponding to each respective state of the session and specifying one or more performance requirements for network traffic exchanged during the state. For example, the centralized controller may determine one or more performance requirements including jitter, latency, packet loss, bandwidth, or cost for a path over which network traffic associated with the session is to be forwarded during each state of the session, based on requirements set forth by a Service-level Agreement (SLA) for the session. The centralized controller transmits the network policies for the states of the session to network devices forming a network.

The network devices form multiple paths through the network from a first client device (e.g., source device) to a second client device (e.g., destination device). A network device receives the network policies for the states of the session and determines a state of a session comprising a bidirectional flow of network traffic between the first and second client devices. The network device selects a path of the multiple paths based on the one or more performance requirements specified by the network policy corresponding to the determined state of the session. The network device forwards network traffic associated with the session over the selected path during the state of the session. In some examples, the network device detects a session establishment state and, responsive to the detection of the session establishment state, selects a path for forwarding network traffic associated with the session during establishment of the session. In some examples, the network device detects a change from a first state of the session to a second state and, responsive to the detected change in state, selects a path for forwarding network traffic associated with the second state. For example, responsive to detecting a change from a session establishment state to a data communication state, the network device selects a path for forwarding network traffic associated with the data communication state.

The techniques of the disclosure may provide specific improvements to the computer-related field of computer networking and path selection that have practical applications. For example, a network device may apply network policies on a per-session flow basis. However, a session may have different performance requirements at different times. The techniques of the disclosure may enable a network device to identify different states (also referred to herein as "phases") such that different network policies may be applied to the different states of a particular session. Different states of a session may have different performance requirements. For example, a session establishment state of a session may have different performance requirements than a data communication state of the session. As another example, a state of a session for a video streaming service during which a user interactively selects a video may have different performance requirements than a state of the same session during which the selected video is streamed to the user. The techniques of the disclosure may enable a network device to identify such different states and apply network policies on session-specific and state-specific level when selecting a path over which network traffic associated with the particular state of the session is forwarded. In this fashion, a network device as described herein may implement more granular control of routing decisions and traffic engineering such that the network device may forward network traffic more efficiently and reserve resources more appropriately, thereby improving the performance of a computer network.

In one example, this disclosure describes a method comprising: receiving, by a network device of a plurality of network devices forming a network, a plurality of network policies, wherein each network policy of the plurality of network policies defines one or more performance requirements for network traffic during each state of a plurality of different states of a session, and wherein the session comprises a bidirectional flow of network traffic between a first client device and a second client device; determining, by the network device, a state of the plurality of different states of the session; selecting, by the network device and based on the one or more performance requirements of the network policy associated with the state, a path of a plurality of different paths through the network; and forwarding, by the network device, network traffic associated with the session along the selected path.

In another example, this disclosure describes a method comprising: identifying, by processing circuitry of a computing device and based on a behavior of a bidirectional flow of network traffic associated with a session, a plurality of states of the session; determining, by the processing circuitry and for each state of the plurality of states of the session, one or more performance requirements for network traffic during the state; generating, by the processing circuitry, a plurality of network policies, wherein each network policy of the plurality of network policies specifies the one or more performance requirements for network traffic during a corresponding state of the plurality of different states of the session; and transmitting, by the processing circuitry and to a network device, the plurality of network policies for application to network traffic associated with the session.

In another example, this disclosure describes a network device of a plurality of network devices forming a network, the network device comprising: a storage device; and processing circuitry configured to: receive a plurality of network policies, wherein each network policy of the plurality of network policies defines one or more performance requirements for network traffic during each state of a plurality of different states of a session, and wherein the session comprises a bidirectional flow of network traffic between a first client device and a second client device; determine a state of the plurality of different states of the session; select, based on the one or more performance requirements of the network policy associated with the state, a path of a plurality of different paths through the network; and forward network traffic associated with the session along the selected path.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1:
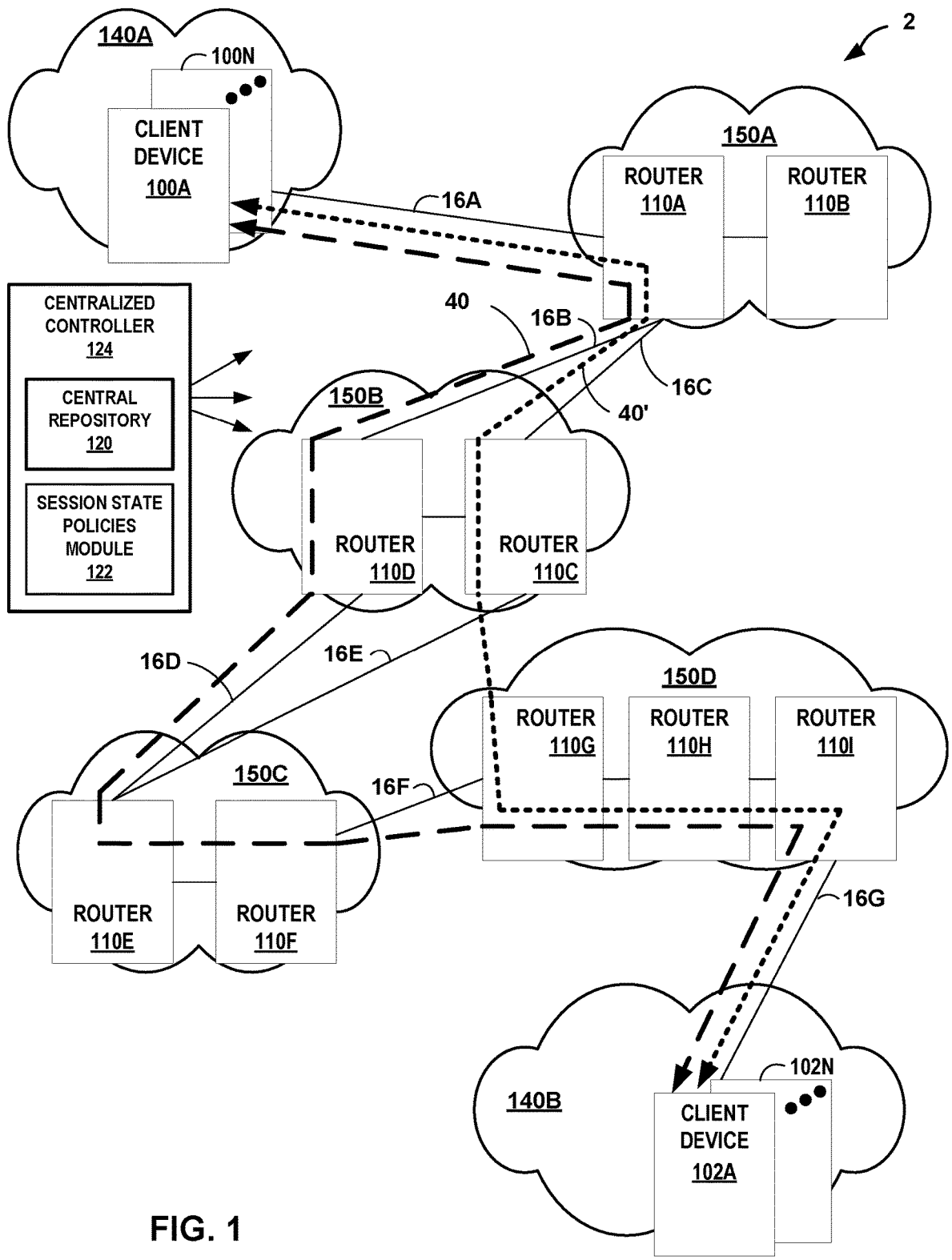
FIG. 1 is a block diagram illustrating an example computer network system in accordance with the techniques of the disclosure.

FIG. 1 is a block diagram illustrating an example computer network system 2 in accordance with the techniques of the disclosure. In the example of FIG. 1, computer network system 2 includes service provider networks 150A-150D (collectively, "service provider networks 150") configured to provide Wide Area Network (WAN) connectivity to disparate customer networks 140A-140B (collectively, "customer networks 140"). Routers 110A-110I (collectively, "routers 110") of service provider networks 150 provide client devices 100A-100N (collectively, "client devices 100") and client devices 102A-102N (collectively, "client devices 102") associated with customer networks 140 with access to service provider networks 150. In some examples, customer networks 140 are enterprise networks. Client devices 100, 102 and/or routers 110 may communicate with communication links 16A-16G (collectively, links "16"), which may be Ethernet, ATM or any other suitable network connections.

Routers 110 are illustrated as routers in the example of FIG. 1. However, techniques of the disclosure may be implemented using any network device, such as switches, routers, gateways, or other suitable network devices that may send and receive network traffic. Customer networks 140 may be networks for geographically separated sites of an enterprise, for example. Each of customer networks 140 may include additional customer equipment, such as, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other routers not depicted in FIG. 1. The configuration of computer network system 2 illustrated in FIG. 1 is merely an example. For example, computer network system 2 may include any number of customer networks 140. Nonetheless, for ease of description, only customer networks 140A-140B are illustrated in FIG. 1.

Service provider networks 150 represent one or more publicly accessible computer networks that are owned and operated by one or more service providers. Although computer network system 2 is illustrated in the example of FIG. 1 as including multiple interconnected service provider networks 150, in other examples computer network system 2 may alternatively include a single service provider network that provides connectivity between customer networks 140. A service provider is usually a large telecommunications entity or corporation. Each of service provider networks 150 is usually a large L3 computer network. Each service provider network 150 is an L3 network in the sense that it natively supports L3 operations as described in the OSI model. Common L3 operations include those performed in accordance with L3 protocols, such as the Internet Protocol (IP). L3 is also known as a "network layer" in the OSI model and the term L3 may be used interchangeably with the phrase "network layer" throughout this disclosure.

Although not illustrated, each service provider network 150 may be coupled to one or more networks administered by other providers, and may thus form part of a large-scale public network infrastructure, e.g., the Internet. Consequently, customer networks 140 may be viewed as edge networks of the Internet. Each service provider network 150 may provide computing devices within customer networks 140, such as client devices 100 and 102, with access to the Internet, and may allow the computing devices within customer networks 140 to communicate with each other.

Although additional routers are not shown for ease of explanation, it should be understood that system 2 may comprise additional network and/or computing devices such as, for example, one or more additional switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other routers. Moreover, although the elements of system 2 are illustrated as being directly coupled, it should be understood that one or more additional network elements may be included along any of network links 16, such that the network elements of system 2 are not directly coupled.

Each service provider network 150 typically provides a number of residential and business services for customer networks 140, including residential and business class data services (which are often referred to as "Internet services" in that these data services permit access to the collection of publicly accessible networks referred to as the Internet), residential and business class telephone and/or voice services, and residential and business class television services.

In some examples, client devices 102 comprise servers executing one or more network service instances. The network service instances may apply one or more network services to traffic of client devices 100. Each network service instance may be, e.g., a virtualized network service instantiated by a virtual machine executed by processing circuitry of a client device 102. In some examples, the network service instances are a plurality of firewall instances that provide stateful firewall services to traffic of client devices 100. In some examples, the network service instances are a plurality of deep packet inspection instances that provide deep packet inspection services to traffic of client devices 100.

Centralized controller 124 provides a logically and in some cases physically centralized controller for facilitating operation of one or more network devices within service provider networks 150, such as routers 110. In some examples, centralized controller 124 may operate in response to configuration input received from a network administrator. In some examples, centralized controller 124 is an orchestrator, Software-defined Networking (SDN) controller, or Virtual Networking Controller (VNC).

In some examples, centralized controller 124 manages functions of service provider networks 150 such as compute, storage, networking, and application resources. For example, centralized controller 124 may implement a security policy across a group of routers 110. Centralized controller 124 may deploy a network service (e.g. a load balancer) within service provider networks 150. In some examples, centralized controller 124 manages network and networking services, such load balancing or security. For example, centralized controller 124 may configure network devices within service provider networks 150, such as routers 110. In some examples, centralized controller 124 maintains routing, networking, and configuration information within a state database.

In some examples, centralized controller 124 is part of a network management system (NMS). The NMS is a cloud-based computing platform that manages service provider networks 150 and provides an integrated suite of network management tools. In general, the NMS of centralized controller 124 may provide a cloud-based platform for network data acquisition, monitoring, activity logging, reporting, predictive analytics, network anomaly identification, and alert generation. In some examples, the NMS applies machine learning techniques to data transmitted to centralized controller 124 to perform traffic engineering, identify root causes of failure, provide real-time insights and simplified troubleshooting for IT operations, and automatically takes remedial action or provides recommendations to proactively address issues with the operation of network system 2. In some examples, the NMS of centralized controller 124 may comprise one or more computing devices, dedicated servers, virtual machines, containers, services or other forms of environments. Additional description of NMS is described in U.S. patent application Ser. No. 17/446,601, entitled "IDENTIFYING ROOT CAUSE OF FAILURES THROUGH DETECTION OF NETWORK SCOPE FAILURES," filed on Aug. 31, 2021, the entire contents of which are incorporated herein by reference.

Session-Based Routing

In some examples, routers 110 may implement a stateful, session-based routing scheme that enables each router 110 to independently perform path selection and traffic engineering. The use of session-based routing may enable routers 110 to eschew the use of a centralized controller, such as a Software-Defined Networking (SDN) controller to perform path selection and traffic engineering. In this way, routers 110 may be more efficient and scalable for large networks where the use of an SDN controller would be infeasible. Furthermore, the use of session-based routing may enable routers 110 to eschew the use of tunnels, thereby saving considerable network resources by obviating the need to perform encapsulation and decapsulation at tunnel endpoints. In some examples, routers 110 implement session-based routing as Secure Vector Routing (SVR), provided by Juniper Networks, Inc.

In the example of FIG. 1, client device 100A of system 2 establishes session 40 with client device 102A. Routers 110 facilitate establishment of session 40 by transporting network traffic between client device 100A and client device 102A. In some examples, client device 100A may be considered a "source" device and client device 102A may be considered a "destination device" in that client device 100A originates session 40 between client device 100A and client device 102A, e.g., client device 100A is the "source" of a packet of a forward packet flow of the session while client device 102A is the "destination" of the packet of the forward packet flow of the session. Client device 100A may be referred to as a "source device" and client device 102A may be referred to as a "destination device" through the disclosure. Session 40 includes a forward packet flow originating from client device 100A and destined for client device 102A and a reverse packet flow originating from client device 102A and destined for client device 100A. A forward packet flow for session 40 traverses a first path including, e.g., client device 100A, routers 110A-110I, and client device 102A. As described in more detail below, routers 110 enable the exchange of traffic between customer network 140A, across service provider networks 150, to customer network 140B.

Client device 100A (e.g., a source device) may establish session 40 with client device 102A (e.g., a destination device) according to one or more L2 or L3 communication session protocols, including Ethernet, TCP, or UDP. As described in more detail below, customer network 140A may form a first network and customer network 140B may form a second network. Routers 110 operate to extend customer network 140A across service provider networks 150 to customer network 140B. In this fashion, customer network 140A and customer network 140B may operate as if they were both part of the same network, even though customer network 140A and customer network 140B may be logically isolated and geographically separate from one another. Furthermore, routers 110 may operate such that the existence of service provider networks 150 between customer network 140A and customer network 140B is transparent to client devices 100, 102.

Client device 100 may establish session 40 according to one or more communication session protocols including TCP, TLS, UDP, or ICMP, etc. For example, to establish session 40 according to TCP such that data may be exchanged according to TCP, client device 100A and client device 102A perform a three-way handshake. Client device 100A sends a first packet comprising a "SYN" flag to client device 102A (e.g., which is forwarded across service provider networks 150 via routers 110). Client device 102A acknowledges receipt of the first packet by responding to client device 100A with a second packet comprising a "SYN-ACK" flag (e.g., which is forwarded across service provider networks 150 via routers 110). Client device 100A acknowledges receipt of the second packet by responding to client device 102A with a third packet comprising an "ACK" flag. After sending the third packet, session 40 is established according to TCP and client devices 100A, 102A may exchange data with one another via session 40. After completing the exchange of data, one of client devices 100A, 102A may terminate the session by sending a "FIN" message to close the connection. Additional example information regarding TCP is described in "TRANSMISSION CONTROL PROTOCOL," Request for Comments (RFC) 793, Internet Engineering Task Force (IETF), September 1981, available at https://tools.ietf.org/html/rfc793, the entire contents of which are incorporated herein by reference.

To establish session 40 according to TLS, client device 100A and client device 102A perform a TLS handshake to establish a secure connection before transferring data. In some examples, the TLS handshake occurs after establishing a TCP session via a TCP handshake. The TLS handshake occurs in three phases: a key exchange phase, a server parameters phase, and a authentication phase. In the key exchange phase, client device 100A sends a ClientHello message that includes cipher and key information. Client device 102A responds with a ServerHello message, which indicates negotiated connection parameters. The combination of the ClientHello and the ServerHello determines the shared keys. During the server parameters phase, client device 102A sends an EncryptedExtensions message followed by a CertificateRequest message to establish the server parameters. Finally, during the authentication phase, client device 100A and client device 102A exchange authentication messages. Specifically, client device 102A sends an optional Certificate message, a CertificateVerify message, and a Finished message. Upon receiving the messages from client device 102A, client device 100A responds with its Authentication messages, e.g., a Certificate message, a CertificateVerify message (if requested), and a Finished message. After client device 100A transmits the Finished message, the handshake is complete, and client devices 100A, 102A may exchange data with one another via session 40 according to TLS. After completing the exchange of data, one of client devices 100A, 102A may terminate the session by sending a "Close Notify" message indicating that the device will not send any more messages on the connection. Additional example information regarding TLS is described in "The Transport Layer Security (TLS) Protocol Version 1.2," RFC 5246, IETF, August 2008, available at https://tools.ietf.org/html/rfc5246; and "The Transport Layer Security (TLS) Protocol Version 1.3," RFC 8446, IETF, August 2018, available at https://tools.ietf.org/html/rfc8446, the entire contents of each of which are incorporated herein by reference.

UDP is a connectionless protocol in that router 110A does not verify that router 110B is capable of receiving data prior to transmitting data. To establish session 40 according to UDP, router 110A transmits a first packet to router 110B. Session 40 may be considered "established" according to UDP upon receipt by router 110A of any packet from router 110B, which implies that router 110B successfully received the first packet from router 110A, responded, and router 110A was able to receive the response from router 110B. Additional example information regarding UDP is described in "User Datagram Protocol," RFC 768, IETF, Aug. 28, 1980, available at https://tools.ietf.org/html/rfc768, the entire contents of which are incorporated herein by reference.

In the example of FIG. 1, when router 110A receives a packet for the forward packet flow originating from client device 100A and destined for client device 102A, router 110A determines whether the packet belongs to a new session (e.g., is the "first" packet or "lead" packet of session 40). In some examples, router 110A determines information included in the first packet (e.g., a source address, source port, destination address, destination port, and protocol) matches an entry in a session table.

If no such entry exists, router 110A determines that the packet belongs to a new session and creates an entry in the session table. Furthermore, if the packet belongs to a new session, router 110A may generate a session identifier for session 40. The session identifier may comprise, e.g., a source address and source port of client device 100A, a destination address and destination port of client device 102A, a protocol used by the first packet, an interface identifier of an interface of client device 100A from which the packet is forwarded, and a Virtual Local Area Network (VLAN) identifier to which client deice 100A is assigned. Router 110A may use the session identifier to identify subsequent packets as belonging to the same session.

In some examples, routers 110 perform stateful routing for session 40. For example, routers 110 may forward each packet of the forward packet flow of session 40 sequentially and along the same forward network path. As described herein, the "same" forward path may mean the same routers 110 that form a segment or at least a portion between a device originating the packet and a device to which the packet is destined (and not necessarily the entire network path between the device originating the packet and the device to which the packet is destined). Further, routers 110 forward each packet of the return flow of session 40 sequentially and along the same return network path. The forward network path for the forward packet flow of session 40 and the return network path of the return packet flow of session 40 may be the same path, or different paths. By ensuring that each packet of a flow is forwarded sequentially and along the same path, routers 110 maintain the state of the entire flow at each router 110, thereby enabling the use of stateful packet services, such as Deep Packet Inspection (DPI) or stateful firewall services.

In the example of FIG. 1, a stateful routing session may be established from ingress router 110A through one or more of intermediate routers 110C-110H to egress router 110I. In this example, router 110A determines that the first packet is an unmodified packet and the first packet of new session 40. Router 110A modifies the first packet to include metadata specifying the session identifier (e.g., the original source address, source port, destination address, destination port, and/or protocol) and/or other policy and control parameters. Router 110A replaces the header of the modified first packet to specify a source address that is an address of router 110A, a source port that is a port via which router 110A forwards the modified first packet toward server 103, a destination address that is an address of the next hop to which router 110A forwards the first packet (e.g., an address of router 110D), and a destination port that is a port of the next hop to which router 110A forwards the first packet (e.g., a port of router 110D). Additionally, router 110A stores the session identifier for session 40 and an indication of the selected next hop for session 40 (e.g., router 110D) such that, upon receiving subsequent packets for session 40, router 110A may identify the subsequent packets as belonging to the same session 40 and forward the subsequent packets along the same path as the first packet without modification to include the metadata.

Router 110A may further identify a network service associated with session 40. For example, router 110A may compare one or more of a source address, source port, destination address, or destination port for the session to a table of service address and port information to identify a service associated with the session. Examples of network services include Hypertext Transfer Protocol (HTTP), a firewall service, a proxy service, packet monitoring or metrics services, etc. For example, router 110A may determine that the forward packet flow of session 40 specifies a destination address and destination port assigned to client device 102A. Router 110A may thereafter store an association between session 40 with the identified network service. As another example, if the source port and/or destination port for session 40 is 80, router 110A may determine that session 40 is associated with an HTTP service. In other examples, router 110A may determine that one or more of a source address, source port, destination address, or destination port for session 40 belong to a block of address or ports indicative that a particular service is associated with session 40.

In some examples, router 110A uses the determined network service for session 40 to select a forward path for forwarding the first packet and each subsequent packet of the forward packet flow of session 40 toward client device 102A. In this fashion, router 110A may perform service-specific path selection to select a network path that best suits the performance requirements of the service. In contrast to a network topology that uses an SDN controller to perform path selection, each router 110 performs path selection. Further, the use of session-based routing enables each router 110 to make routing decisions at the service- or application-level, in contrast to conventional routers that are only able to make routing decisions at the flow level.

Router 110A forwards the modified first packet to router 110D. Intermediate router 110D receives the modified first packet and determines whether the modified first packet includes metadata specifying the session identifier. In response to determining that the modified first packet includes metadata specifying the session identifier, intermediate router 110D determines that router 110D is not an ingress device such that router 110D does not attach metadata specifying the session identifier.

As described above with respect to router 110A, router 110B determines whether the packet belongs to a new session (e.g., is the "first" packet or "lead" packet of the session) by determining whether a source address, source port, destination address, destination port, and protocol of the first packet matches an entry in a session table. If no such entry exists, router 110B determines that the packet belongs to a new session and creates an entry in the session table. Furthermore, if the packet belongs to a new session, router 110B generates a session identifier for the session. The session identifier used by router 110B to identify the session for the first packet may be different from the session identifier used by router 110A to identify the same session for the first packet, because each router 110A, 110B uses the header source address, source port, destination address, and destination port of the first packet to generate the session identifier, and this header information may be modified by each preceding router 110 as each router 110 forwards the first packet along the forward path. Furthermore, each router 110 may store this header information to identify a previous router 110 (or "waypoint") and a next router 110 (or "waypoint") such that each router 110 may reconstruct the same forward path and reverse path for each subsequent packet of the session.

Router 110B replaces the header of the modified first packet to specify a source address that is an address of router 110B, a source port that is a port via which router 110B forwards the modified first packet toward client device 102A, a destination address that is an address of the next hop to which router 110B forwards the first packet (e.g., an address of router 110C for session 40 along the first path), and a destination port that is a port of the next hop to which router 110B forwards the first packet (e.g., a port of router 110C). Router 110B forwards the modified first packet to router 110C. Additionally, router 110B stores the session identifier for the session such that, upon receiving subsequent packets for the session, router 110B may identify subsequent packets as belonging to the same session and forward the subsequent packets along the same path as the first packet.

Subsequent intermediate routers 110C-110H process the modified first packet in a similar fashion as routers 110A and 110B such that routers 110 forward the subsequent packets of the session along the same path as the first packet. Further, each router 110 stores a session identifier for the session, which may include an identification of the previous router 110 along the network path. Thus, each router 110 may use the session identifier to forward packets of the reverse packet flow for the session along the same network path back to client device 100A.

A router 110 that may forward packets for a forward packet flow of the session to a destination for the packet flow is an egress, or "terminus" router. In the foregoing example, router 110I is a terminus router because router 110I may forward packets to client device 102A. Router 110I receives the modified first packet that comprises the metadata specifying the session identifier (e.g., the original source address, source port, destination address, and destination port).

Router 110I identifies the modified first packet as destined for a service terminating at router 110I by determining that the destination source address and destination source port specified in the metadata of the modified lead packet corresponds to a destination reachable by router 110I (e.g., client device 102A). Router 110I recovers the original first packet by removing the metadata from the modified first packet and using the metadata to modify the header of the first packet to specify the original source address, source port, destination address, and destination port. Router 110I forwards the recovered first packet to client device 102A. The use of session-based routing may therefore form a series of waypoints (e.g., routers 110) interconnected by path "segments" (e.g., end-to-end route vectors between each waypoint).

Additional information with respect to session-based routing and SVR is described in U.S. Pat. No. 9,729,439, entitled "COMPUTER NETWORK PACKET FLOW CONTROLLER," and issued on Aug. 8, 2017; U.S. Pat. No. 9,729,682, entitled "NETWORK DEVICE AND METHOD FOR PROCESSING A SESSION USING A PACKET SIGNATURE," and issued on Aug. 8, 2017; U.S. Pat. No. 9,762,485, entitled "NETWORK PACKET FLOW CONTROLLER WITH EXTENDED SESSION MANAGEMENT," and issued on Sep. 12, 2017; U.S. Pat. No. 9,871,748, entitled "ROUTER WITH OPTIMIZED STATISTICAL FUNCTIONALITY," and issued on Jan. 16, 2018; U.S. Pat. No. 9,985,883, entitled "NAME-BASED ROUTING SYSTEM AND METHOD," and issued on May 29, 2018; U.S. Pat. No. 10,200,264, entitled "LINK STATUS MONITORING BASED ON PACKET LOSS DETECTION," and issued on Feb. 5, 2019; U.S. Pat. No. 10,277,506, entitled "STATEFUL LOAD BALANCING IN A STATELESS NETWORK," and issued on Apr. 30, 2019; U.S. Pat. No. 10,432,522, entitled "NETWORK PACKET FLOW CONTROLLER WITH EXTENDED SESSION MANAGEMENT," and issued on Oct. 1, 2019; and U.S. Patent Application Publication No. 2020/0403890, entitled "IN-LINE PERFORMANCE MONITORING," published on Dec. 24, 2020, the entire content of each of which is incorporated herein by reference in its entirety.

Additional information with respect to session-based routing and SVR is described in "Secure Vector Routing (SVR)," Internet Draft, Network Working Group, IETF, Oct. 1, 2021, available at https://datatracker.ietf.org/doc/draft-menon-svr, the entire contents of which are incorporated herein by reference.

Exchanging Service and Topology State Information

In some examples, to implement session-based routing, each router 110 maintains a local repository of service and topology state information for each other router 110. The service and topology state information includes services reachable from each router 110, as well as a network topology from each router for reaching these services. Each router 110 may transmit changes in the services reachable from the router 110 and/or changes in the network topology for reaching the services from the router to central repository 120 of centralized controller 124, e.g., a server or other computing device. Further, each router 110 may receive service and topology state information for each other router 110 in system 2 from central repository 120. In some examples, each router 110 transmits and receives service and topology state information in the form of a JavaScript Object Notation (JSON) document which specifies the service and topology state information for each router 110.

In some examples, routers 110 operate according to a publish-subscribe model. According to this model, each router 110 publishes, to central repository 120, one or more changes in services reachable from the router 110 and/or one or more changes in a network topology for reaching the services from the router 110. Other routers 110 may subscribe to receive publications for the router 110 from central repository 120. In response to receiving changes in the service and topology state information for a router 110, central repository 120 stores the changes in the service and topology state information for the router 110. Further, central repository 120 publishes the changes in the service and topology state information for the router 110 to other routers 110 that are subscribed to receive updates and/or changes for the router 110.

In the foregoing example, router 110A receives a packet, determines session 40 for the forward packet flow comprising the packet, determines a service associated with session 40, and selects a network path for forwarding the packet. Router 110A may use its local copy of the service and topology state information for each router 110 to select the network path for forwarding the packet. For example, router 110A may use the identified service associated with the packet and a network topology for reaching the identified service to select a network path that comports with an SLA requirement or other session performance requirements for the service. Router 110A may then forward the packet and subsequent packets for the forward packet flow of session 40 along the selected path. In this fashion, router 110A may perform service-specific path selection in that router 110 may use criteria specific to the service associated with the packet to select a network path that best suits the performance requirements of the service.

In some examples, interfaces of routers 110 may be assigned to one or more "neighborhoods." A "neighborhood" is defined as a label applied to an interface of a router 110. The routers 110 within the same neighborhood are capable of forming a peering relationship with one another. For example, each router 110 having an interface to which a neighborhood label is applied is reachable over a Layer-3 network to each other router 110 having an interface to which the same neighborhood label is applied. In some examples, one or more neighborhoods may be aggregated into a "district." A district is a logical grouping of one or more neighborhoods. Typically, an Autonomous System (AS) (also referred to herein as an "Authority") may be divided into one or more districts, each district including one or more neighborhoods.

In some examples, each router 110 maintains a local repository of service and topology state information only for those other routers 110 within the same neighborhood. In some examples, each router 110 maintains a local repository of service and topology state information only for those other routers 110 within the same district of neighborhoods. As an example, one or more domains of service provider network 150 may be organized into different "districts," and each subdomain within each domain may be considered to be a neighborhood within that district. In this example, each router 110A, 110B and 110C within service provider network 150 may maintain service and topology state information only for one another, and not for routers outside of service provider network 150. As another example, router 110A and 110B may be organized into a first district or neighborhood, while routers 110B and 110C may be organized into a second district or neighborhood. In this example, router 110A maintains service and topology state information only for routers 110A and 110B and not for router 110C, router 110C maintains service and topology state information only for routers 110B and 110C and not for router 110A, while router 110B may maintain service and topology state information for each of routers 110A, 110B, and 110C. In other examples, an administrator may assign one or more service provider networks 150 into one or more districts, one or more neighborhoods, or a combination of districts and neighborhoods as suits the needs of network system 2.

In some examples, central repository 120 implements a Service and Topology Exchange Protocol (STEP) repository, available from 128 Technology, Inc. and Juniper Networks, Inc. Additional information with respect to the exchange of service and topology state information is described in U.S. Patent Application Publication No. 2020/0366590, entitled "CENTRAL AUTHORITY FOR SERVICE AND TOPOLOGY EXCHANGE," published on Nov. 19, 2020; U.S. Patent Application Publication No. 2020/0366599, entitled "SOURCE-BASED ROUTING," published on Nov. 19, 2020; U.S. Patent Application Publication No. 2020/0366598, entitled "SERVICE AND TOPOLOGY EXCHANGE PROTOCOL," published on Nov. 19, 2020; U.S. Patent Application Publication No. 2020/0366589, entitled "ROUTING USING SEGMENT-BASED METRICS," published on Nov. 19, 2020; and U.S. patent application Ser. No. 16/050,722, entitled "NETWORK NEIGHBORHOODS FOR ESTABLISHING COMMUNICATION RELATIONSHIPS BETWEEN COMMUNICATION INTERFACES IN AN ADMINISTRATIVE DOMAIN," filed on Jul. 31, 2018, the entire content of each of which is incorporated herein by reference in its entirety.

In-Flow Performance Monitoring

Bidirectional Forwarding Detection (BFD) is a network protocol that is used to detect faults in a bidirectional path between two network devices, such as link 16B between routers 110A and 110D. BFD provides low-overhead, short-duration detection of failures in the link between the two routers. Further, BFD provides a single mechanism that can be used for liveness detection over any media, at any protocol layer, with a wide range of detection times and overhead, to avoid a proliferation of different methods between adjacent devices. BFD operates on top of any data protocol (network layer, link layer, tunnels, etc.) being forwarded between two network devices. Typically, BFD operates in a unicast, point-to-point mode. BFD packets are carried as a payload of whatever encapsulating protocol is appropriate for the medium and network.

In accordance with BFD, routers 110A and 110D establish a BFD session over link 16B. Typically, routers 110A and 110D establish and tear down a BFD session with a three-way handshake. Routers 110A and 110D may declare link 16B to be operational only after two-way communication is established between routers 110A and 110D. However, this does not preclude the use of unidirectional links. For example, link 16B may represent a first unidirectional link from router 110A to router 110D, and a second unidirectional link from router 110D to router 110A.

Once the BFD session is established, routers 110A and 110D transmit BFD packets periodically over link 16B. Each router 110A, 110D estimates how quickly it may send and receive BFD packets so as to negotiate, with the peer router 110A, 110D how rapidly failure detection may occur. In some examples, routers 110A and 110D may modify, in real-time, these estimates to adapt to network congestion, changes in latency or bandwidth, or other unusual situations. This may allow for the use of a shared medium between fast network devices and slow network devices, while allowing the fast network devices to more rapidly detect failures while allowing the slow network devices to participate in failure detection.

BFD may operate in two modes: asynchronous mode and demand mode. In asynchronous mode, if one of routers 110A and 110D stops receiving BFD packets for some amount of time (the length of which is negotiated as described above), routers 110A and 110D may assume that link 16B (or a component, device, or path forming link 16B) has failed. In demand mode, routers 110A and 110D may negotiate not to send periodic BFD packets in order to reduce overhead. This assumes that routers 110A and 110D have another way to verify connectivity to one another, such as via the physical layer. However, either router 110A, 110D may still send BFD packets if needed.

Additionally, either router 110A, 110D may use an Echo function. When this function is active, router 110A, e.g., sends a stream of Echo packets to router 110D. Router 110D responds by transmitting the Echo packets back to router 110A via the forwarding plane of router 110D. Router 110A may use the Echo function to test the forwarding path of router 110D, and vice versa. Additional example information regarding BFD is described in "Bidirectional Forwarding Detection (BFD)," RFC 5880, IETF, June 2010, available at https://datatracker.ietforg/doc/html/rfc5880, the entire contents of which are incorporated herein by reference.

Routers 110 create a separate BFD session for each communications path and data protocol in use between two network devices. For example, to perform fault detection along the entire path between router 110A and 110I, a distinct BFD session may be established along each link 16, e.g., such as a first BFD session between routers 110A and 110D along link 16B, a second BFD session between routers 110D and 110E along link 16D, a third BFD session between routers 110E and 110F, and so on.

In some examples, the use of a dedicated BFD session between two routers may be infeasible, such as where the use of such dedicated BFD sessions would consume network resources that could otherwise be used for sending and receiving customer traffic. To reduce the consumption of network resources used for performance monitoring, routers 110 may use in-flow performance monitoring. For example, each router 110 may modify packets carrying customer data for a session between client devices 100 to include metadata comprising, in addition to the session information, performance metrics information. For example, a session between client device 100A and client device 102A comprises a forward flow originating from client device 100A and destined for client device 102A and a reverse flow originating from client device 102A and destined for client device 100A. Router 110A receives, from client device 100A, a first packet of the forward flow, the first packet comprising a header and a data payload. Router 110A modifies the first packet to further include metadata comprising first performance information and forwards the modified first packet to router 110D. Router 110D may obtain the first performance information from the metadata of the first packet. Further, router 110D may remove the metadata and forward the first packet toward client device 102A (e.g., by forwarding the packet to router 110C).

Additionally, router 110D receives, from client device 102A, a second packet of the reverse flow, the second packet comprising a header and a data payload. Router 110D modifies the second packet to further include metadata comprising second performance information and forwards the modified second packet to router 110A. Router 110A may obtain the second performance information from the metadata of the second packet. Further, router 110A may remove the metadata and forward the second packet toward client device 100A.

In some examples, the metadata comprises a BFD packet. In some examples, the metadata comprises a timestamp that routers 110A, 110D may use to determine performance information. In some examples, the metadata comprises a measure of network performance, such as a measure of latency, jitter, packet loss, bandwidth, etc. For example, router 110A modifies a first packet of a forward flow to include metadata specifying a first timestamp indicative of a time at which router 110A forwards the first packet toward router 110D. Router 110D modifies a second packet of a reverse flow to include metadata specifying a second timestamp indicative of a time at which router 110D received the first packet from router 110A and/or a third timestamp indicative of a time at which router 110D forwards the second packet toward router 110A. Router 110A and 110D may exchange a plurality of such modified packets to obtain multiple datapoints regarding the performance of link 16B between router 110A and 110D. Router 110A, for example, may process the multiple timestamps to generate metrics for link 16B between router 110A and 110D, such as latency, jitter, packet loss, bandwidth, etc. In this fashion, routers 110A and 110D may conduct performance monitoring of link 16B without interrupting customer traffic between client devices 100 or consuming additional network resources through the use of dedicated BFD sessions for performance monitoring.

Additional information with respect to performance monitoring is described in U.S. Patent Application Publication No. 2020/0403890, entitled "IN-LINE PERFORMANCE MONITORING," published on Dec. 24, 2020; and U.S. Patent Application Publication No. 10,200,264, entitled "LINK STATUS MONITORING BASED ON PACKET LOSS DETECTION," issued on Feb. 5, 2019, the entire content of each of which is incorporated herein by reference in its entirety.

Session Migration

As described above, routers 110 forward each packet of the forward packet flow of session 40 sequentially and along the same forward network path. Further, routers 110 forward each packet of the reverse packet flow of session 40 sequentially and along the same reverse network path (which may or may not be the same as the forward network path). For example, as depicted in the example of FIG. 1A, router 110A forwards network traffic for a forward packet flow for session 40 to router 110D, which in turn forwards the network traffic for session 40 to router 110E, and so on through routers 110F-110I.

However, the path used by routers 110 to forward traffic for session 40 may no longer be suitable due to dynamic changes in customer networks 140 or service provider network 150. The path may become unsuitable, for example, where one of links 16 or an interface of one of routers 110 fails, where a priority of network traffic for session 40 changes, where the performance of the path over which session 40 traverses degrades or fails to meet SLA performance requirements, or where changes in customer networks 140 make the path unsuitable for session 40 (e.g., such as due to a failure of a client gateway).

Therefore, in some examples, routers 110 may modify the path over which mid-stream traffic for session 40 is forwarded. For example, one or more routers 110 may select a different next-hop router 110 to which to forward packets for session 40 or select a different ingress or egress interface with which to send or receive the packets for session 40. As described above, each router generates a session identifier for session 40 that is based on the IP address and port of both the source router and destination router. Therefore, when modifying the path used by session 40, routers 110 may use special handling procedures to ensure that the stateful nature of session 40 is not lost when migrating session 40 to the new path. In some examples, these special handling procedures may include the sharing of metadata between routers of the old path with routers of the new path. This metadata may include, e.g., source and destination IP address and port information of client devices 100A and 102A, respectively, as well as one or more policies, such as network, routing, or security policies, for application to the traffic between client devices 100A and 102A.

In some examples, router 110A maintains an action chain for each flow. The action chain includes a chain descriptor which specifies a status of the flow. The action chain further includes a series of functional blocks, each functional block defining a specific function to be performed as part of routing packets associated with the flow. Router 110 may operate according to each functional block of the action chain so as to effectuate routing of packets for the flow corresponding to the action chain. For example, a functional block of the action chain may specify a routing operation that includes an identification of, e.g., an egress interface of router 110A, an IP address or port of router 110A, a next-hop router 110D, an ingress interface of router 110D, or an IP address or port of router 110D, etc.

Router 110A may modify a path for session 40 so as to migrate session 40 in the following manner. Router 110A deactivates an existing flow for session 40. To deactivate an existing flow for session 40, router 110A modifies the chain descriptor of the action chain for a flow for session 40 to specify that the flow is invalid and/or deactivated, such that router 110A may not use the action chain to forward subsequent packets for the flow. Next, router 110A establishes a new flow for session 40 while the existing flow is deactivated. For example, router 110A may define a new action chain reflecting the changes to session 40. As an example where next-hop router 110D fails, router 110A defines a functional block of the new action chain which specifies a routing operation that includes an identification of, e.g., an egress interface of router 110A, an IP address or port of router 110A, a next-hop router 110C (instead of router 110D), an ingress interface of router 110C, or an IP address or port of router 110C, etc. In some examples, while establishing the new flow, router 110A may perform special handling of packets received for the flow, such as buffering the packets, dropping the packets, forwarding the packets to a service path, etc. Router 110A activates the new flow and forwards the received packets for session 40 via the new path for the new flow. For example, to activate the new flow, router 110A may commence handling packets received for the flow in accordance with the new action chain reflecting the changes to the flow. Router 110A may subsequently delete the old action chain that is now invalid and/or deactivated.

In some examples, router 110A may not necessarily be required to notify other routers (e.g., routers 110D and 110C) of the change to the path and/or migration of session 40. As described above, each router 110 generates a session identifier for session 40 that is based on the IP address and port of both the source router and destination router. If, for example, router 110D receives a packet including an unknown session identifier (which may be the case for a packet for a session that is migrated mid-stream), then router 110D may store the session identifier and perform session-based routing of the packet so as to treat the packet as a first packet of a new session.

Routers 110 may modify a path used by the forward packet flow or the reverse packet flow for session 40 in a number of situations. For example, router 110D may modify a packet flow when router 110D receives, from router 110A, a packet for the forward packet flow of session 40 on an incorrect interface of router 110D. In this example, router 110D may modify the forward packet flow as described above so that router 110D receives subsequent packets for the forward packet flow from router 110A on a correct interface.

As another example, routers 110 may modify a packet flow in response to detecting a routing failure. A routing failure may occur, for example, if router 110A detects a failure of link 16B, a failure of an interface of router 110D, or a failure of router 110D (e.g., the next-hop router for the forward packet flow of session 40). In response, for example, router 110A may modify the packet flow by selecting a different router 110 (e.g., such as router 110C) as the next-hop router for the forward packet flow of session 40. As another example, router 110A may modify the packet flow by selecting link 16C to router 110C or directing the packet flow to a different ingress interface of router 110D. In some examples, routers 110 may use BFD to detect path failures, as described above.

As another example, routers 110 may modify a packet flow in response to a message collision. In some examples, routers 110 may modify the forward and reverse flows of a session so as to define routing policies based on the latest activity (e.g., received packet) received for the session. However, where a first and second router simultaneously transmit a respective first and second packet to one another, and the first router receives the second packet before the second router receives the first packet, the first router may establish a flow for the session based on the second packet. Subsequently, the second router may receive the first packet, which may require the first router to reestablish the flow for the session. In this example, the first router may modify the flow as described above according to routing policies defined by the subsequently received second packet.

In some examples, routers 110 may modify a packet flow in response to detecting additional information related to a network configuration of client devices 100. For example, routers 110 may modify the packet flow in response to detecting the use of Source Network Address Translation (SNAT) by one or more client devices 100.

Additional information with respect to migration of sessions is described in U.S. Pat. No. 10,841,206, entitled "FLOW MODIFICATION INCLUDING SHARED CONTEXT," issued on Nov. 17, 2020; U.S. Patent Application Publication No. 2021/0036953, entitled "FLOW MODIFICATION INCLUDING SHARED CONTEXT," published on Feb. 4, 2021; U.S. Patent Application Publication No. 2021/0036953, entitled "FLOW MODIFICATION INCLUDING SHARED CONTEXT," published on Feb. 4, 2021; U.S. Pat. No. 10,257,061, entitled "DETECTING SOURCE NETWORK ADDRESS TRANSLATION IN A COMMUNICATION SYSTEM," issued on Apr. 19, 2019; U.S. Provisional Patent Application No. 63/128,672, entitled "NETWORKING DEVICE AND METHOD FOR MODIFYING NETWORK LAYER PATHS IN RESPONSE TO SESSION STATE CHANGES," filed on Dec. 21, 2020; U.S. Pat. No. 10,432,519, entitled "PACKET REDIRECTING ROUTER," issued on Oct. 1, 2019; and U.S. Pat. No. 10,425,511, entitled "METHOD AND APPARATUS FOR MANAGING ROUTING DISRUPTIONS IN A COMPUTER NETWORK," issued on Sep. 24, 2019, the entire content of each of which is incorporated herein by reference in its entirety.

Forwarding Using Session State Changes

In accordance with the techniques of the disclosure, session state policies module 122 of central repository 120 identifies different states of session 40 comprising a bidirectional flow of network traffic between client devices 100A, 102A and generates a different network policy for each state of session 40. As described in more detail below, routers 110 select a network path for network traffic associated with each state of session 40 based on a network policy corresponding to the state of session 40.

In one example, session state policies module 122 identifies multiple states of session 40. As described above, session 40 comprises a bidirectional flow of network traffic between client devices 100A, 102A, e.g., a forward packet flow originating from client device 100A and destined for client device 102A and a reverse packet flow originating from client device 102A and destined for client device 100A. For example, session state policies module 122 identifies the multiple states of session 40 by examining behavior of the bidirectional flow of network traffic associated with session 40 over a period of time. In some examples, session state policies module 122 examines the behavior of the bidirectional flow of network traffic associated with session 40 over a lifetime of the session (e.g., from establishment to termination of the session, or from a time at which a first packet associated with session 40 is sent to a time at which a last packet associated with session 40 is sent). In some examples, the multiple states include a session establishment state, a data communication state, and a teardown state. During the session establishment state, client devices 100, 102 may perform socket setup, cryptography setup, or exchange a TCP handshake or a TLS handshake. During the data communication state, client devices 100, 102 may exchange data. During the teardown state, client devices 100, 102 terminate the session and close the connection.

Additionally, session state policies module 122 generates multiple network policies, each network policy corresponding to each respective state of session 40 and specifying one or more performance requirements for network traffic exchanged during the respective state. For example, session state policies module 122 determines one or more performance requirements including jitter, latency, packet loss, bandwidth, or cost for a path over which network traffic associated with session 40 is to be forwarded during each state of session 40. In some examples, session state policies module 122 determines the performance requirements for the network traffic based on requirements set forth by an SLA for session 40. Session state policies module 122 transmits the network policies for the states of session 40 to routers 110.

The techniques of the disclosure may enable routers 110 to detect many different states of sessions of many different types, and perform path selection on a state-specific, session-specific basis. For example, traffic of network system 2 may be associated with a particular type of traffic category or traffic class, such as a real-time traffic category, such as a Voice over Internet Protocol (VoIP) category, an Interactive Video category, a remote desktop category, or a gaming category or a non-real-time traffic category, such as a network management category, a streaming video category, an interactive data category, or a data transfer category. Each category of traffic may depend on different performance characteristics. For example, traffic associated with a VoIP category may be very sensitive to latency, loss, and jitter. As another example, traffic associated with a gaming class is highly susceptible to latency but fairly insensitive to loss. As another example, streaming video may be relatively insensitive to loss, latency, and jitter, but may depend on a large bandwidth. Each session of many different sessions serviced by routers 110 may be associated with a different type of traffic category than each other session. Furthermore, as described herein, each state of each session may additionally be associated with a different type of traffic category than each other state of the same session. The techniques of the disclosure may enable routers 110 to use different network policies for path selection depending on the detected state of a session such that routers 110 may perform not only session-specific path selection, but additionally may perform path selection specific to the state of the session.

As an illustrative example with respect to FIG. 1, routers 110 of network system 2 forward traffic between clients 100, 102 associated with a plurality of different sessions of a plurality of different types. For example, each different type of session may be associated with a different type of application. For example, each of a first web conferencing application provided by a first vendor, a second web conferencing application provided by a second vendor, an email application, and a video streaming application may be associated with a respective type of session.

In the example of FIG. 1, session 40 is of a first session type. Session state policies module 122 receives information describing a behavior of a bidirectional flow of network traffic between client devices 100, 102 associated with sessions of the first type over a period of time. In some examples, the information describes the behavior of the bidirectional flow of network traffic between client devices 100, 102 associated with sessions of the first type over a lifetime of such sessions (e.g., from establishment to termination or teardown of the session). Session state policies module 122 determines, based on the behavior, multiple states of the session of the first session type. As described in more detail with respect to FIG. 3, session state policies module 122 determines that sessions of the first type (including session 40) include a session establishment state, a data communication state, and a teardown state.

Based on requirements set forth by an SLA for sessions of the first type, session state policies module 122 determines a first network policy specifying first performance requirements for network traffic exchanged during the session establishment state of sessions of the first type. As an example, the first network policy may specify low latency and DSCP signaling requirements for network traffic during the first state. Further, session state policies module 122 determines, based on requirements set forth by the SLA for sessions of the first type, a second network policy specifying second performance requirements for network traffic exchanged during the data communication state of sessions of the first type. The second network policy may specify low latency, low jitter, high bandwidth, and DSCP Real Time Interactive requirements for network traffic during the second state. Session state policies module 122 determines, based on requirements set forth by the SLA for sessions of the first type, a third network policy specifying one or more third performance requirements for network traffic exchanged during the teardown state of sessions of the first type. The third network policy may specify high latency, high jitter, and low bandwidth requirements for network traffic during the third state.

Session state policies module 122 transmits, to routers 110, the first network policy and the second network policy for use in path selection by routers 110 when forwarding traffic associated with session 40 during each respective state of session 40. In some examples, session state policies module 122 transmits, to routers 110, session state identification information enabling routers 110 to identify the different states of sessions of the first type.

In some examples, the session state identification information may specify one or more triggers that router 110A may use to identify a transition from one state to another state. In some examples, the triggers indicative of a transition from one state to another state include one or more of a specific packet number, a specific packet header, a specific number of bytes of "application data" exchanged between client devices 100A, 102A, or a specific payload sequence detected in packets exchanged between client devices 100A, 102A.

Router 110A, for example, receives the first, second, and third network policies. Based on the session state identification information received from session state policies module 122, router 110A determines that session 40 is of the first session type. Further, router 110A determines a state of session 40. In some examples, the determined state is a current state of session 40. In some examples, the determined state is a predicted state of session 40, such as a state into which session 40 is anticipated to transition or change. As one example, router 110A determines that the state of session 40 is the session establishment state. For example, router 110A may determine that the state of session 40 is the session establishment state in response to receiving a first packet (e.g., "lead packet") for session 40 from client device 100A. As another example, router 110A may determine that the state of session 40 is the session establishment state in response to determining that a packet received from client device 100A is a TCP "SYN" packet or other packets used to establish a session.

As another example, router 110A uses a specific packet number of session 40 as a trigger to identify a transition from a first state to a second state of session 40. In one example, the specific packet number may be '4' because a TCP handshake is 3 packets long. Therefore, a state transition from the session establishment state to the data communication state may occur at the fourth packet of session 40.

As another example, router 110A uses a specific packet header of session 40 as a trigger to identify a transition from a first state to a second state of session 40. In one example, the specific packet header may include a TLS ClientHello message (which may indicate the start of a "key exchange state" of a TLS session) or a TLS KeyExchange message (which may indicate the end of the "key exchange state" of the TLS session.

As another example, router 110A uses a specific number of bytes exchanged between client devices 100A and 102A as a trigger to identify a transition from a first state to a second state of session 40. For example, where an application associated with session 40 involves a web browser of client device 100A, client device 100A may download a large volume of information from client device 102A, such as JavaScript executable code. After completing the download, client device 100A executes the downloaded code. Router 110A may use the size of the downloaded file as the "specific number of bytes" trigger to indicate a transition from a first state of session 40 where client device 100A downloads the file to a second state of session 40 where client device 100A executes the file.

As another example, router 110A uses a specific payload sequence of packets exchanged between client devices 100A and 102A as a trigger to identify a transition from a first state to a second state of session 40. For example, router 110A may perform deep packet inspection (DPI) and observe a marker in a payload, and use the marker as a "specific payload sequence" trigger indicative of a transition from one state to another state of session 40. For example, in response to detecting a payload of a packet indicates a streaming video quality is down-sampled from 1080p to 720p, router 110A may determine a change in state of session 40.

Router 110A selects, based on the state of session 40, a path over which to forward traffic associated with session 40. As depicted in the example of FIG. 1, routers 110 form multiple paths through service provider networks 150 from, e.g., client device 100A to client device 102A. For example, a first path includes routers 110A and 110D-110I and a second path includes routers 110A, 110C, and 110G-110I. In response to determining that the state of session 40 is the session establishment state, router 110A selects a path based on the first network policy corresponding to the session establishment state of session 40.

In some examples, router 110A uses in-line performance monitoring (e.g., such as via BFD) to obtain metrics for links to adjacent routers 110. In other examples, router 110A may obtain metrics for links to non-adjacent routers 110 from, e.g., central repository 120 as part of the service and topology state information transmitted by central repository 120 to each router 110. Router 110A may use metrics obtained for each link 16 to generate metrics for a plurality of paths from router 110A to destination device, e.g., such as a path from router 110A to client device 102A (e.g., for packets of the forward packet flow received from client device 100A) or a path from router 110A to client device 100A (e.g., for packets of the reverse packet flow received from a previous hop router 110). Typically, such paths comprise multiple routers 110 interconnected by links 16. Additional information with respect to the use of path metrics to perform multi-hop path selection is described in U.S. application Ser. No. 17/449,618, entitled "METRIC-BASED MULTI-HOP PATH SELECTION," and filed on Sep. 30, 2021, the entire content of which is incorporated herein by reference in its entirety.

Router 110A determines that first metrics of the first path (e.g., including routers 110A and 110D-110I) satisfies the first performance requirements specified by the first network policy and that second metrics of the second path (e.g., including routers 110A, 110C, and 110G-110I) does not satisfy the first performance requirements specified by the first network policy. In response to the determination, router 110A selects the first path. In some examples, a plurality of paths satisfy the first performance requirements, and router 110A selects a path that is a minimum viable path (MVP), e.g., the worst (or cheapest) path that still satisfies the first performance requirements specified by the first network policy. Router 110A forwards network traffic associated with session 40 along the selected first path during the session establishment state of session 40.

Subsequently, router 110A may determine that the state of session 40 is the data communication state. In some examples, router 110A detects a change from the session establishment state of session 40 to the data communication state. In some examples, router 110A determines the change from one state to another state based on an elapsed time of session 40. For example, the session state identification information received from session state policies module 122 may specify that session 40 is within the data communication state after a predetermined amount of time has elapsed since router 110A received a first packet associated with session 40, wherein the predetermined amount of time is specified by an administrator or determined by session state policies module 122. In some examples, router 110A determines the change from one state to another state based on a number of packets received for session 40. For example, the session state identification information received from session state policies module 122 may specify that session 40 is within the data communication state after router 110A receives "N" number of packets associated with session 40, wherein "N" refers to a number specified by an administrator or determined by session state policies module 122. As another example, router 110A may determine that the state of session 40 is the data communication state in response to determining that a packet received from client device 100A is a TCP "ACK" packet, thereby completing the TCP handshake between client devices 100A and 102A, a packet received from client device 100A is a TLS "Finished" packet, thereby completing the TLS handshake between client devices 100A and 102A, or any other type of packet that indicates session 40 has established.

Router 110A selects a path over which to forward traffic associated with session 40 for the new state. For example, in response to determining that the state of session 40 is changed to the data communication state, router 110A selects the second network policy corresponding to the data communication state of session 40. Router 110A determines that the first metrics of the first path (e.g., including routers 110A and 110D-110I) do not satisfy the second performance requirements specified by the second network policy (or have degraded and no longer satisfy the second performance requirements). Further, router 110A determines that the second metrics of the second path (e.g., including routers 110A, 110C, and 110G-110I) satisfy the second performance requirements specified by the second network policy. In response to the determination, router 110A selects the second path for forwarding network traffic associated with session 40 during the data communication state of session 40. In some examples, in response to determining that the second path should be used and not the first path, router 110A migrates network traffic associated with session 40 along the first path to session 40' along the second path using, for example, the session migration techniques described above. Router 110A forwards network traffic associated with session 40' along the second path during the data communication state of session 40'.

In the foregoing example, session 40 is described as including a session establishment state and a data communication state. As an example where session 40 is a TCP session, during the session establishment state, client devices 100A and 102A exchange a TCP handshake, while during the data communication state, client devices 100A and 102A exchange data packets. As another example where session 40 is a TLS session, during the session establishment state, client devices 100A and 102A exchange a TLS handshake, while during the data communication state, client devices 100A and 102A exchange data packets. Using the techniques set forth herein, routers 110 may differentiate between the session establishment state, the data communication state, or the teardown state by identifying packets exchanged between client devices 100A and 102A as being part of the TCP handshake or TLS handshake, as being data packets, or as including a TCP "FIN" message, etc.

In some examples, a router 110 may determine the state of session 40 based on an elapsed time of session 40. For example, routers 110 may determine that session 40 is within a session establishment state in response to receiving a first packet associated with session 40. Routers 110 may determine that session 40 is within a data communication state after a predetermined amount of time has elapsed since receiving the first packet (e.g., 1 second, 5 seconds, 1 minute, etc.). Further, routers 110 may determine that session 40 is within a teardown state in response to receiving no packets associated with session 40 within a predetermined amount of time (e.g., 1 minute, 2 minutes, 5 minutes, etc.). In another example, a user of client device 100A may interact with a training application, wherein client device 102A streams a video of a fixed duration to client device 100A and after the video, the user answers a series of text-based questions. Routers 110 may determine that that session 40 is within a first state during the length of the duration of the video, and after the length of time of the video elapses, routers 110 may determine that that session 40 is within a second state.

In some examples, a router 110 may determine the state of session 40 based on a type of packet received by the router 110. For example, routers 110 may determine that session 40 is within a session establishment state in response to receiving a packet comprising a TCP "SYN" message from client device 100A. Routers 110 may determine that session 40 is within a data communication state in response to receiving a packet comprising a TCP "ACK" message from client device 100A. Further, routers 110 may determine that session 40 is within a teardown state in response to receiving a packet comprising a TCP "FIN" message from either client device 100A or 102A.

As another example, routers 110 may determine that session 40 is within a session establishment state in response to receiving a packet comprising a TLS "ClientHello" message from client device 100A. Routers 110 may determine that session 40 is within a data communication state in response to receiving a packet comprising a TLS "Finished" message from client device 100A. Further, routers 110 may determine that session 40 is within a teardown state in response to receiving a packet comprising a TLS "Close Notify" message from either client device 100A or 102A.

In some examples, session 40 may include other states in addition or in the alternative to the session establishment state, the data communication state, and the teardown state. For example, client device 102A may provide a video streaming service accessed by client device 100A via session 40. In this example, session 40 may include a first state during which a user of client device 100A accesses a web page provided by client device 102A to interactively browse and select a video. Additionally, session 40 may include a second state during which client device 102A streams the video selected by the user to client device 100. Routers 110 may differentiate between the first state and the second state based on behavior of the bidirectional flow between client devices 100A and 102A. For example, during the first state, client devices 100A and 102A may exchange bursts of packets as the user of client device 100A interactively browses a selection of videos available from client device 102A. During the second state, client device 102A may send a large quantity of packets to client device 100A as client device 102A streams the video to client device 100A, while client device 100A may send few or no packets while the user watches the video.

Because a quality of the video may correlate to a bandwidth required to stream the video, session 40 may include different states corresponding to different video qualities provided by client device 102A. For example, session 40 may include a first state wherein the video streaming occurs in 720p format (1280×720 pixels or "Standard HD") and a second state wherein the video streaming occurs in 1080p format (1920×1080 pixels or "Full HD"). In this example, the first state may require a lower bandwidth to provide a satisfactory user experience than a bandwidth required by the second state. Therefore, router 110A may detect that session 40 is within the first state (e.g., client device 102A streams the video file in Standard HD). In response, router 110A selects a first path providing a low bandwidth and forwards network traffic associated with session 40 along the first path during the first state of session 40. In response to detecting that session 40 changes to the second state (e.g., client device 102A streams the video file in Full HD), router 110A selects a second path providing a high bandwidth and forwards network traffic associated with session 40 along the second path during the second state of session 40 (depicted as session 40' in FIG. 1).

As another example, for a long-lived session, the session may predominantly operate within a single state (referred to herein as a "steady state" of the session." For example, a streaming video service provided by a server may have a first state which exhibits a momentary burst of protocol handshakes at the outset of the session (TCP, TLS, HTTPS, etc.). Subsequently, during a second state of the session, the server sends a video (using, e.g., H.264 format) to a client device for viewing for an extended time (e.g., such as an hour or more). After the video is completed, the session may close during a third state. Using the techniques herein, routers 110 may apply different network policies to select different paths for forwarding network traffic associated with the session during each of these three distinct states.

As another example, a session may involve an application providing an online collaboration tool to edit a document. A user of client device 100A may load the document (which involves the asymmetric flow of data predominantly from client device 102A (e.g., a server hosting the document) to client device 100A. The user makes edits and commits changes (which involves the asymmetric flow of data predominantly from client device 100A to client device 102A hosting the document). Most broadband networks, including both consumer- and enterprise-class, have dramatically different speeds based on directionality. For example, download speeds are typically much higher than upload speeds. For such a session where asymmetric bandwidth requirements exist but the predominant data flow is known a priori, routers 110 may apply different network policies to take advantage of the anticipated data flows between client devices 100, 102.

As another example, a session may involve a VoIP call to a call center. During a first state, a user may be placed on hold and audio may be streamed to the user in the form of on-hold music. During this first state, router 110 may apply a first network policy to select a low-quality path over which to forward network traffic associated with the on-hold music. The session may change to a second state when the user is connected to a representative at the call center. During this second state, router 110 may apply a second network policy to select a high-quality path over which to forward network traffic associated with the voice call between the user and representative.

In some examples, routers 110 may identify a state of session 40 based on the participating endpoint (e.g., the client or server) that supplies the predominant amount of data, whether in the form of packets or bytes of information, etc., to its counterpart, and select a network policy for path selection based on which client device 100, 102 is anticipated to transmit the most amount of information. For example, where client device 100A downloads a large file over network system 2 from client device 102A, client device 100A issues a small request and receive a comparatively large volume of information in return. Despite the fact that there is bidirectional communication (client device 100A issues the request, and acknowledges the packets received from client device 102A), client device 102A has the focus of the session during this state of the session. Therefore, in some examples, each state of session 40 may be classified as client-focused, server-focused, or balanced, and a corresponding network policy may be selected for path selection for forwarding traffic during the respective state. For example, a session may be in the "balanced" state during protocol handshakes, bidirectional VoIP calls within a steady state, etc.) In some examples, routers 110 may proactively migrate network traffic to an appropriate path in response to an anticipated or impending state change of session 40.

In some examples, the states of session 40 may include a real-time state, a time-sensitive state, or a time-insensitive state. For example, routers 110 may forward network traffic associated with a video collaboration application during a real-time and "balanced" state of session 40. Routers 110 may forward network traffic associated with a video streaming application during a time-sensitive and "server-focused" state of session 40. Routers 110 may forward network traffic associated with a file download application during a time-insensitive and "server-focused" state of session 40. In some examples, session 40 may include additional or alternative states not expressly described herein.

Figure 2:
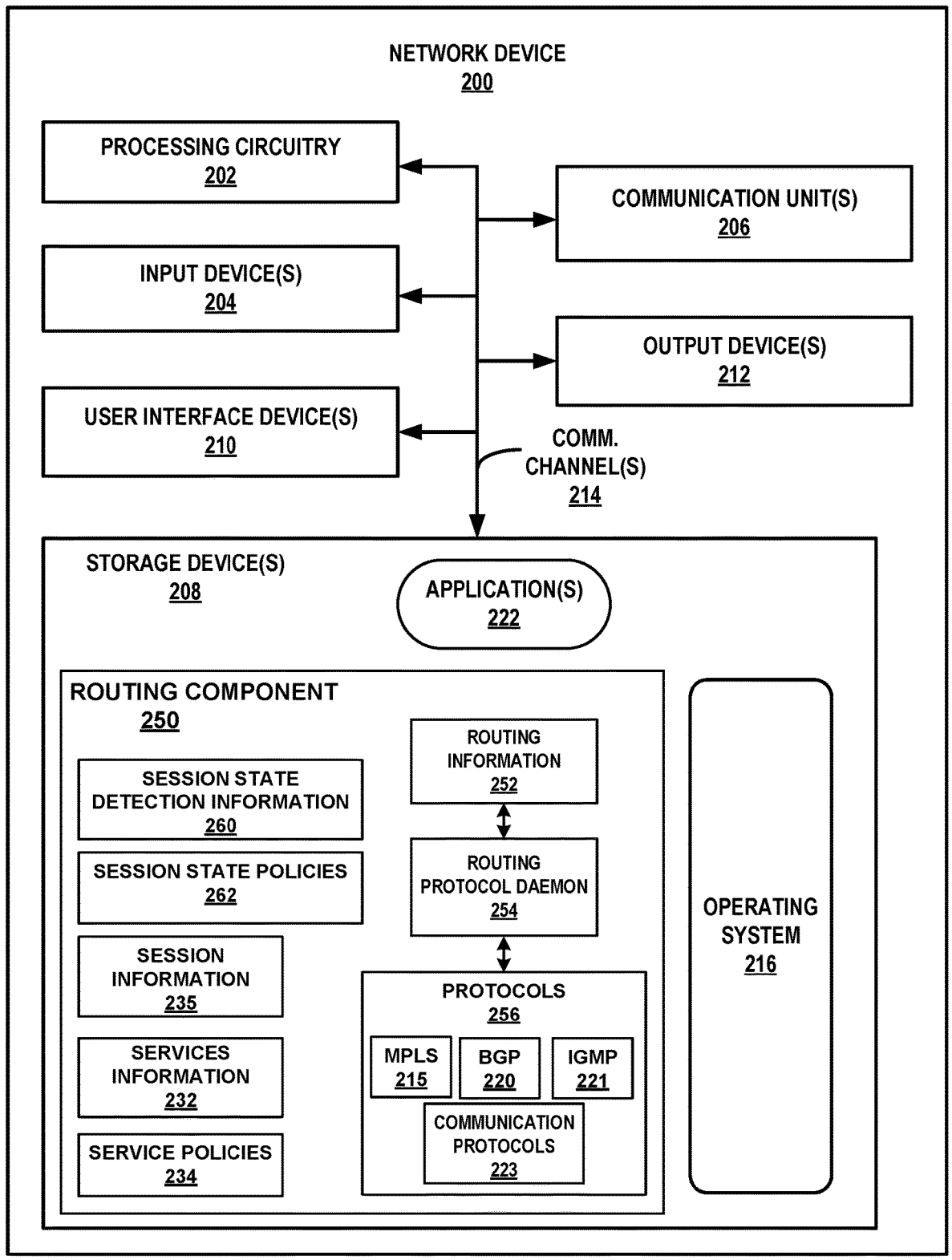
FIG. 2 is a block diagram illustrating an example network device configured to forward traffic in accordance with the techniques of the disclosure.

FIG. 2 is a block diagram illustrating an example network device 200 configured to forward traffic in accordance with the techniques of the disclosure. In general, network device 200 may be an example implementation of one of routers 110 of FIG. 1. FIG. 2 illustrates a particular example of a network device 200 that includes processing circuitry 202 for executing any one or more of applications 222, routing component 250, or any other network device described herein. Other examples of network device 200 may be used in other instances.

Although shown in FIG. 2 as a stand-alone network device 200 for purposes of example, a computing device that operates in accordance with the techniques of this disclosure may be any component or system that includes one or more processors or other suitable computing environment for executing software instructions and, for example, need not necessarily include one or more elements shown in FIG. 2 (e.g., communication units 206; and in some examples, components such as storage device(s) 208 may not be co-located or in the same chassis as other components). In some examples, network device 200 may be implemented as a virtualized network function (VNF). In some examples, one or more aspects of network device 200 can be run as one or more containers or as one or more applications within virtual machines of a Network Functions Virtualization (NFV) platform using, e.g., VirtIO and SRIOV network virtualization technologies, or on bare-metal servers. In some examples, network device 200 is a physical network device, such as a switch, router, gateway, or other device that sends and receives network traffic.

As shown in the example of FIG. 2, network device 200 includes processing circuitry 202, one or more input devices 204, one or more communication units 206, one or more output devices 212, one or more storage devices 208, and one or more user interface (UI) device(s) 210. Network device 200, in one example, further includes one or more application(s) 222 and operating system 216 that are executable by network device 200. Each of components 202, 204, 206, 208, 210, and 212 are coupled (physically, communicatively, and/or operatively) for inter-component communications. In some examples, communication channels 214 may include a system bus, a network connection, an inter-process communication data structure, or any other method for communicating data. As one example, components 202, 204, 206, 208, 210, and 212 may be coupled by one or more communication channels 214.

Processing circuitry 202, in one example, are configured to implement functionality and/or process instructions for execution within network device 200. In some examples, processing circuitry 202 comprises one or more hardware-based processors. For example, processing circuitry 202 may be capable of processing instructions stored in storage device 208. Examples of processing circuitry 202 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 208 may be configured to store information within network device 200 during operation. Storage device 208, in some examples, is described as a computer-readable storage medium. In some examples, storage device 208 is a temporary memory, meaning that a primary purpose of storage device 208 is not long-term storage. Storage device 208, in some examples, is described as a volatile memory, meaning that storage device 208 does not maintain stored contents when the computer is turned off. Examples of volatile memories include random access memories (RAM), dynamic random access memories (DRAM), static random access memories (SRAM), and other forms of volatile memories. In some examples, storage device 208 is used to store program instructions for execution by processing circuitry 202. Storage device 208, in one example, is used by software or applications running on network device 200 to temporarily store information during program execution.

Storage devices 208, in some examples, also include one or more computer-readable storage media. Storage devices 208 may be configured to store larger amounts of information than volatile memory. Storage devices 208 may further be configured for long-term storage of information. In some examples, storage devices 208 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Network device 200, in some examples, also includes one or more communication units 206. Network device 200, in one example, utilizes communication units 206 to communicate with external devices via one or more networks, such as one or more wired/wireless/mobile networks. Communication units 206 may include a network interface, such as an Ethernet card, an optical transceiver, a radio frequency transceiver, or any other type of device that can send and receive information. Other examples of such network interfaces may include 3G and WiFi radios. In some examples, communication units 206 my include a plurality of high-speed network interface cards. In some examples, network device 200 uses communication unit 206 to communicate with an external device. For example, network device 200 uses communication unit 206 to communicate with other routers 110 and/or client devices 100, 102 of FIG. 1 via links 16 of FIG. 1 with which communication unit 206 is connected.

Network device 200, in one example, also includes one or more user interface devices 210. User interface devices 210, in some examples, are configured to receive input from a user through tactile, audio, or video feedback. Examples of user interface devices(s) 210 include a presence-sensitive display, a mouse, a keyboard, a voice responsive system, video camera, microphone or any other type of device for detecting a command from a user. In some examples, a presence-sensitive display includes a touch-sensitive screen. In some examples, a user such as an administrator of service provider networks 150 may enter configuration data for network device 200.

One or more output devices 212 may also be included in network device 200. Output device 212, in some examples, is configured to provide output to a user using tactile, audio, or video stimuli. Output device 212, in one example, includes a presence-sensitive display, a sound card, a video graphics adapter card, or any other type of device for converting a signal into an appropriate form understandable to humans or machines. Additional examples of output device 212 include a speaker, a cathode ray tube (CRT) monitor, a liquid crystal display (LCD), or any other type of device that can generate intelligible output to a user.

Network device 200 may include operating system 216. Operating system 216, in some examples, controls the operation of components of network device 200. For example, operating system 216, in one example, facilitates the communication of one or more applications 222 with processing circuitry 202, communication unit 206, storage device 208, input device 204, user interface devices 210, and output device 212. Applications 222 may also include program instructions and/or data that are executable by network device 200.

In some examples, processing circuitry 202 executes routing component 250, which determines routes of received packets and forwards the packets accordingly. Routing component 250 communicates with other routers, e.g., such as routers 110 of FIG. 1, to establish and maintain a computer network, such as computer network system 2 of FIG. 1, for transporting network traffic between one or more customer devices. Routing protocol daemon (RPD) 254 of routing component 250 executes software instructions to implement one or more control plane networking protocols 256. For example, protocols 256 may include one or more routing protocols, such as Internet Group Management Protocol (IGMP) 221 and/or Border Gateway Protocol (BGP) 220, for exchanging routing information with other routing devices and for updating routing information base (RIB) 252, Multiprotocol Label Switching (MPLS) protocol 215, and other routing protocols. Protocols 256 may further include one or more communication session protocols, such as TCP, UDP, TLS, or ICMP.

Routing information 252 may describe a topology of the computer network in which network device 200 resides, and may also include routes through the shared trees in the computer network. Routing information 252 describes various routes within the computer network, and the appropriate next hops for each route, i.e., the neighboring routing devices along each of the routes. Routing information 252 may be a radix tree programmed into dedicated forwarding chips, a series of tables, a complex database, a link list, a radix tree, a database, a flat file, or various other data structures.

Session information 235 stores information for identifying sessions. In some examples, session information 235 is in the form of a session table. For example, services information 232 comprises one or more entries that specify a session identifier. In some examples, the session identifier comprises one or more of a source address, source port, destination address, destination port, or protocol associated with a forward packet flow and/or a reverse packet flow of the session. As described above, when routing component 250 receives a packet for a forward packet flow originating from client device 100A and destined for client device 100B of FIG. 1, routing component 250 determines whether the packet belongs to a new session (e.g., is the "first" packet or "lead" packet of session 40). To determine whether the packet belongs to a new session, routing component 250 determines whether session information 235 includes an entry corresponding to a source address, source port, destination address, destination port, and protocol of the first packet. If an entry exists, then the session is not a new session. If no entry exists, then the session is new and routing component 250 generates a session identifier for the session and stores the session identifier in session information 235. Routing component 250 may thereafter use the session identifier stored in session information 235 for the session to identify subsequent packets as belonging to the same session.

Services information 232 stores information that routing component 250 may use to identify a service associated with a session. In some examples, services information 232 is in the form of a services table. For example, services information 232 comprises one or more entries that specify a service identifier and one or more of a source address, source port, destination address, destination port, or protocol associated the service. In some examples, routing component 250 may query services information 232 with one or more of a source address, source port, destination address, destination port, or protocol of a session for a received packet to determine a service associated with a session. For example, routing component 250 may determine a service identifier based on a correspondence of a source address, source port, destination address, destination port, or protocol in services information 232 to a source address, source port, destination address, destination port, or protocol specified by a session identifier. Routing component 250 retrieves, based on the service associated with the packet, one or more service policies 234 corresponding to the identified service. The service policies may include, e.g., a path failover policy, a Dynamic Host Configuration Protocol (DHCP) marking policy, a traffic engineering policy, a priority for network traffic associated with the session, etc. Routing component 250 applies, to the packet, the one or more service policies 234 that correspond to the service associated with the packet.

In accordance with the techniques of the disclosure, routing component 250 receives, via communication units 206 and from central repository 120 of FIG. 1, a different network policy for each session serviced by network device 200. For example, each network policy corresponds to a different state of session 40 of FIG. 1. In some examples, each network policy specifies one or more performance requirements, including jitter, latency, packet loss, bandwidth, or cost for a path over which network traffic is to be forwarded during the corresponding state. In one example, session 40 comprises a session establishment state, a data communication state, and a teardown state.

For example, a session establishment state typically includes a burst of machine-to-machine messages at the outset of the session. These are typified by many roundtrips between a client device and a server for each 'layer' that negotiates on each endpoint. Laying the session's setup activity during the session establishment state onto the fastest path until the handshaking portion of the session is complete may improve the user experience.

Therefore, in this example, routing component 250 receives, for session 40, a first network policy corresponding to the session establishment state of session 40, a second network policy corresponding to the data communication state of session 40, and a third network policy corresponding to the teardown state, etc. The first network policy specifies one or more performance requirements for a path over which network traffic is to be forwarded during the session establishment state. In one example, the first network policy specifies a latency requirement. Further, the second network policy specifies one or more performance requirements for a path over which network traffic is to be forwarded during the data communication state. In one example, the first network policy specifies a bandwidth requirement. In some examples, the first network policy specifies one or more performance requirements that are different than the one or more performance requirements specified by the second policy. For example, the first network policy may specify a requirement for latency that is different than a requirement for latency specified by the second policy. Routing component 250 stores the network policies as session state policies 262.

Additionally, routing component 250 receives, via communication units 206 and from central repository 120 of FIG. 1, information for detecting each state of each type of session serviced by network device 200. In some examples, the information comprises a session profile for each type of session. The session profile describes a behavior of a session over a period of time. In some examples, the session profile describes the behavior of the session during session establishment (e.g., during a TCP handshake or TLS handshake) and after the session establishment completes (e.g., such as during a steady-state over the lifetime of the session, such as while data is communicated between client devices 100, 102). In some examples, the session profile describes the behavior of the session over the lifetime of the session (e.g., from establishment to termination or teardown of the session). For example, the session profile may specify a plurality of states of the session and a behavior of a source client device 100 and a destination client device 102. With respect to the foregoing example, a session profile for session 40 may specify the session establishment state, the data communication state, and the teardown state. Furthermore, the session profile may specify that a TCP handshake or TLS handshake is performed during the session establishment state and a first network policy for use in response to detecting a first packet of the TCP handshake or TLS handshake (e.g., for use during the session establishment state). Additionally, the session profile may specify that the data communication state occurs after completion of the TCP handshake or TLS handshake and a second network policy for use in response to detecting completion of the TCP handshake or TLS handshake (e.g., fur use during the data communication state). Additionally, the session profile may specify that the teardown state occurs after a TCP "FIN" message and a third network policy for use in response to detecting the TCP "FIN" message (e.g., for use during the teardown state). In other examples, the session profile may specify that a particular state of session 40 occurs after a certain number of bytes or packets are exchanged between client devices 100, 102 or after a predetermined amount of time has elapsed. In other examples, the session profile may specify that a particular state of session 40 occurs after client devices 100, 102 exhibit a particular behavior, such as exchanging certain types of packets, exchanging packets in a particular pattern or frequency, exchanging packets of a particular size or carrying a particular payload or data component, or client devices 100, 102 exchange a plurality of byte patterns. In some examples, the session profile specifies a state machine of session 40 so as to enable routing component 250 to model a behavior of session 40 and determine, based on the model, a state of session 40. Routing component 250 stores the information as session detection information 260.

Routing component 250 uses session detection information 260 to determine a state of session 40. In some examples, routing component 250 determines a state of session 40 in response to receiving a first packet associated with session 40. In some examples, routing component 250 determines a state of session 40 on a periodic basis, such as after receiving a predetermined number of packets associated with session 40 or after a certain amount of time has elapsed. In some examples, routing component 250 identifies the state of session 40 may applying a model of session 40. The model may describe behavior of session 40 over a period of time. In some examples, the model may describe behavior of session 40 over a lifetime of session 40 (e.g., such as from establishment to termination of session 40). In some examples, the model describes the protocols involved in each state of the session, and when the protocol handshakes complete. Each protocol handshake is a simple state (e.g., such as client-focused, server-focused, or balanced). In some examples, the model may describe a typical volume of traffic (e.g., as packets or bandwidth) sent by each client device 100A, 102A before a change in state of session 40.). In some examples, the model may specify which, if any, of the states of session 40 is most dominant (e.g., client-focused, server-focused, or balanced), and therefore may be considered to be a steady state of session 40.

As an example, routing component 250 determines that session 40 is within the session establishment state. For example, routing component 250 may determine that the state of session 40 is the session establishment state in response to determining that a packet received from client device 100A is a TCP "SYN" packet, thereby beginning the TCP handshake between client devices 100A and 102A.

Routing component 250 selects a network policy from session state policies 262 corresponding to the state of session 40. Based on the one or more performance requirements specified by the network policy corresponding to the state, routing component 250 selects a path and forwards network traffic associated with session 40 over the selected path during the state of the session.

In response to determining that session 40 is within the session establishment state, routing component 250 selects the first network policy corresponding to the session establishment state. Routing component 250 determines one or more metrics of a plurality of paths, and selects a path that satisfies the one or more performance requirements specified by the first network policy corresponding to the session establishment state. For example, routing component 250 selects a first path that comprises a latency metric that exceeds the latency requirement specified by the first network policy. In some examples, a plurality of paths exceed the latency requirement specified by the first network policy, and routing component 250 selects a path that is a minimum viable path (MVP), e.g., the worst (or cheapest) path that still satisfies the latency requirement specified by the first network policy. Routing component 250 forwards network traffic associated with session 40 over the selected first path during the session establishment state.

As another example, routing component 250 determines that session 40 is within the data communication state. In some examples, routing component 250 detects a change in session 40 from the session establishment state to the data communication state. For example, routing component 250 may analyze packets exchanged between client devices 100A and 102A to determine that client devices 100A and 102A have completed a TCP handshake or TLS handshake, therefore completing the session establishment state. For example, routing component 250 may determine that the state of session 40 is the data communication state in response to determining that a packet received from client device 100A is a TCP "ACK" packet, completing the TCP handshake between client devices 100A and 102A.

In response to determining that session 40 is within the data communication state, routing component 250 selects the second network policy corresponding to the data communication state. Routing component 250 determines one or more metrics of a plurality of paths, and selects a path that satisfies the one or more performance requirements specified by the second network policy corresponding to the session establishment state. For example, routing component 250 selects a path that comprises a bandwidth metric that exceeds the bandwidth requirement specified by the second network policy. Routing component 250 migrates session 40 from the first path (e.g., while in the session establishment state) to the second path and forwards network traffic associated with session 40 over the selected second path during the data communication state.

Figure 3:
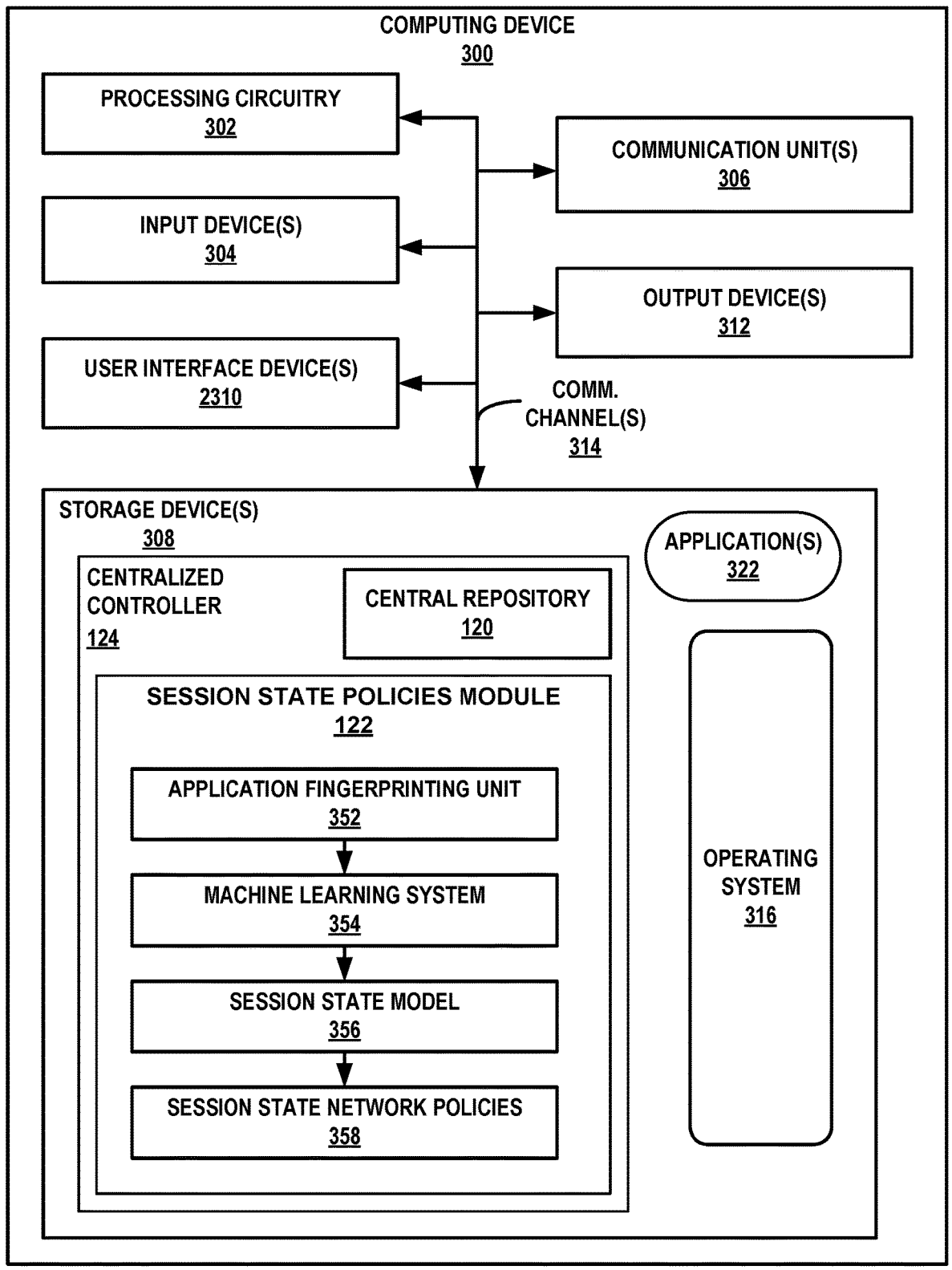
FIG. 3 is a block diagram illustrating an example computing device for executing a centralized controller configured to identify states of a session in accordance with the techniques of the disclosure.

FIG. 3 is a block diagram illustrating an example computing device for executing a centralized controller configured to identify states of a session in accordance with the techniques of the disclosure. In general, computing device 300 may be an example implementation of central repository 120 of FIG. 1. FIG. 3 illustrates a particular example of a server or other computing device 300 that includes processing circuitry 302 for executing any one or more of applications 322, centralized controller 124, central repository 120, session state policies module 122, or any other computing device described herein. Other examples of computing device 300 may be used in other instances.

Although shown in FIG. 3 as a stand-alone computing device 300 for purposes of example, a computing device that operates in accordance with the techniques of this disclosure may be any component or system that includes one or more processors or other suitable computing environment for executing software instructions and, for example, need not necessarily include one or more elements shown in FIG. 3 (e.g., communication units 306; and in some examples, components such as storage device(s) 308 may not be co-located or in the same chassis as other components). In some examples, computing device 300 may be implemented as a virtualized network function (VNF). In some examples, one or more aspects of computing device 300 can be run as one or more containers or as one or more applications within virtual machines of a Network Functions Virtualization (NFV) platform using, e.g., VirtIO and SRIOV network virtualization technologies, or on bare-metal servers. In some examples, computing device 300 is a physical network device, such as a switch, router, gateway, or other device that sends and receives network traffic.

As shown in the example of FIG. 3, computing device 300 includes processing circuitry 302, one or more input devices 304, one or more communication units 306, one or more output devices 312, one or more storage devices 308, and one or more user interface (UI) device(s) 310. Computing device 300, in one example, further includes one or more application(s) 322 and operating system 316 that are executable by computing device 300. Each of components 302, 304, 306, 308, 310, and 312 are coupled (physically, communicatively, and/or operatively) for inter-component communications. In some examples, communication channels 314 may include a system bus, a network connection, an inter-process communication data structure, or any other method for communicating data. As one example, components 302, 304, 306, 308, 310, and 312 may be coupled by one or more communication channels 314.

Processing circuitry 302, in one example, are configured to implement functionality and/or process instructions for execution within computing device 300. In some examples, processing circuitry 302 comprises one or more hardware-based processors. For example, processing circuitry 302 may be capable of processing instructions stored in storage device 308. Examples of processing circuitry 302 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 308 may be configured to store information within computing device 300 during operation. Storage device 308, in some examples, is described as a computer-readable storage medium. In some examples, storage device 308 is a temporary memory, meaning that a primary purpose of storage device 308 is not long-term storage. Storage device 308, in some examples, is described as a volatile memory, meaning that storage device 308 does not maintain stored contents when the computer is turned off. Examples of volatile memories include random access memories (RAM), dynamic random access memories (DRAM), static random access memories (SRAM), and other forms of volatile memories. In some examples, storage device 308 is used to store program instructions for execution by processing circuitry 302. Storage device 308, in one example, is used by software or applications running on computing device 300 to temporarily store information during program execution.

Storage devices 308, in some examples, also include one or more computer-readable storage media. Storage devices 308 may be configured to store larger amounts of information than volatile memory. Storage devices 308 may further be configured for long-term storage of information. In some examples, storage devices 308 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 300, in some examples, also includes one or more communication units 306. Computing device 300, in one example, utilizes communication units 306 to communicate with external devices via one or more networks, such as one or more wired/wireless/mobile networks. Communication units 306 may include a network interface, such as an Ethernet card, an optical transceiver, a radio frequency transceiver, or any other type of device that can send and receive information. Other examples of such network interfaces may include 3G and WiFi radios. In some examples, communication units 306 my include a plurality of high-speed network interface cards. In some examples, computing device 300 uses communication unit 306 to communicate with an external device. For example, computing device 300 uses communication unit 306 to communicate with other routers 110 with which communication unit 306 is connected.

Computing device 300, in one example, also includes one or more user interface devices 310. User interface devices 310, in some examples, are configured to receive input from a user through tactile, audio, or video feedback. Examples of user interface devices(s) 310 include a presence-sensitive display, a mouse, a keyboard, a voice responsive system, video camera, microphone or any other type of device for detecting a command from a user. In some examples, a presence-sensitive display includes a touch-sensitive screen. In some examples, a user such as an administrator of service provider networks 150 may enter configuration data for computing device 300.

One or more output devices 312 may also be included in computing device 300. Output device 312, in some examples, is configured to provide output to a user using tactile, audio, or video stimuli. Output device 312, in one example, includes a presence-sensitive display, a sound card, a video graphics adapter card, or any other type of device for converting a signal into an appropriate form understandable to humans or machines. Additional examples of output device 312 include a speaker, a cathode ray tube (CRT) monitor, a liquid crystal display (LCD), or any other type of device that can generate intelligible output to a user.

Computing device 300 may include operating system 316. Operating system 316, in some examples, controls the operation of components of computing device 300. For example, operating system 316, in one example, facilitates the communication of one or more applications 322 with processing circuitry 302, communication unit 306, storage device 308, input device 304, user interface devices 310, and output device 312. Applications 322 may also include program instructions and/or data that are executable by computing device 300.

In some examples, processing circuitry 302 executes centralized controller 124, which includes central repository 120. Central repository 120 operates as a central repository for storing service and topology state information for each router 110 within service provider networks 150. The service and topology state information includes services reachable from each router 110, as well as a network topology from each router for reaching these services. In some examples, when a router 110 becomes active within service provider networks 150 (such as when the router 110 is installed or reboots), the router 110 transmits a complete copy of the service and topology state information of the router 110 to central repository 120, which stores and maintains the service and topology state information for each router 110. Central repository 120 may thereafter distribute the service and topology state information for each router 110 to each other router 110 within service provider networks 150 permitted according to one or more network policies defined by an administrator. Subsequently, each router 110 may transmit only changes to the service and topology state information of the router 110 to central repository 120, which may distribute such changes to the other routers 110. In some examples, central repository 120 transmits and receives service and topology state information in the form of a JavaScript Object Notation (JSON) document which specifies the service and topology state information for each router 110.

In accordance with the techniques of the disclosure, central repository 120 further includes session state policies module 122. Session state policies module 122 identifies, for each session of multiple sessions between client devices 100, 102 of FIG. 1, different states of the session and generates a different network policy for each state of the session. Session state policies module 122 includes application fingerprinting unit 352, machine learning system 354, session state model 356, and session state policies 358.

In one example, application fingerprinting unit 352 may generate a unique identifier for each application which sends or receives network traffic over network system 2. As described herein, an "application" typically refers to a software program or protocol that performs a specialized function. The purpose of a typical application is to establish a connection between a client device and a server hosting the application with the intention of sending and receiving data to/from the server. Applications exchange such data by establishing one or more sessions, e.g., bidirectional flows of traffic between two devices, each bidirectional flow comprising a forward packet flow and a reverse packet flow. In some examples, application fingerprinting unit 352 identifies characteristics of each application so as to uniquely identify the application.

For each application, session state policies module 122 collects behavior of sessions associated with the application over a period of time of each session. For example, session state policies module 122 collects examples packets exchanged between two client devices, the data specified by such packets, and the times at which such packets are exchanged, from establishment of the session until the session ends or is terminated. Session state policies module 122 may further collect examples of the establishment of the session (such as an example of a TCP or TLS handshake), network protocols used by the client devices, or other types of information not expressly described herein.

In some examples, machine learning system 354 processes the information about the behavior of the sessions associated with the application to generate session state model 356. Session state model 356 describes one or more states of the session. In some examples, session state model 356 further specifies information for detecting each state of the session.

For example, machine learning system 354 may convert such information about the behavior of the sessions into vectors and tensors (e.g., multi-dimensional arrays) upon which machine learning system 354 may apply mathematical operations, such as linear algebraic, nonlinear, or alternative computation operations. In some examples, statistical analysis, such as a statistical heuristic, is applied to the information about the behavior of the sessions associated with the application to determine one or more states of the session. In other examples, a big data framework is implemented so as to allow for the use of a large amount of available data for training and optimizing session state model 356.

In some examples, machine learning system 354 uses the information about the behavior of the sessions as training data to teach session state model 356 to weigh different features of the session information as having more or less importance. In some examples, machine learning system 354 uses the information about the behavior of the sessions to teach machine learning model 354 to apply different coefficients that represent features in the information about the behavior of the sessions as having more or less importance with respect to determining different states of the session or identifying indicators of changes from one state to another state. The amount and type of information required to train session state model 356 may depend on the complexity of the interaction between client devices 100, 102 and the number of different states of the session.

In some examples, different states of the session may occur in response to indicators of a state change of the session. Session state model 356 may further identify one or more indicators of the state change of the session, such as a TCP socket setup or TCP handshake, a TLS handshake, a web request from a client device to a server, a response from a server to a client device, a form submission by a client device, a selection of a weblink, Uniform Resource Locator (URL), or web request, uploading of a document to a server and/or manipulation of the document, a TCP socket keepalive message between a server and a client device, a TCP socket teardown message, a stream of audio or video data, or a particular sequence of packets. These indicators may describe a specific event or trigger that moves a session from one state to the next, and which routers 110 may observe or detect during monitoring of the exchange of packets between client devices 100, 102.

For example, session state model 356 may determine that session 40 includes a session establishment state in response to identifying a packet comprising a TCP "SYN" message from client device 100A. Session state model 356 may determine that session 40 includes a data communication state in response to identifying a packet comprising a TCP "ACK" message from client device 100A. Further, session state model 356 may determine that session 40 includes a teardown state in response to identifying a packet comprising a TCP "FIN" message from either client device 100A or 102A.

As another example, session state model 356 may determine that session 40 includes a session establishment state in response to identifying a packet comprising a TLS "ClientHello" message from client device 100A. Session state model 356 may determine that session 40 includes a data communication state in response to identifying a packet comprising a TLS "Finished" message from client device 100A. Further, session state model 356 may determine that session 40 includes a teardown state in response to identifying a packet comprising a TLS "Close Notify" message from either client device 100A or 102A.

In some examples, session state model 356 outputs, to routers 110, a session profile specifying each state of the session and information for identifying each state of the session. The session profile describes a behavior of a session over a period of time. For example, the session profile may specify a plurality of states of the session and a behavior of a source client device 100 and a destination client device 102 over the lifetime of the session. As an example, a session profile for session 40 of FIG. 1 may specify a session establishment state, a data communication state, and a teardown state. Furthermore, the session profile may specify that a TCP handshake or TLS handshake is performed during the session establishment state. Additionally, the session profile may specify that the data communication state occurs after completion of the TCP handshake or TLS handshake. In other examples, the session profile may specify that a particular state of session 40 occurs after a certain number of bytes or packets are exchanged between client devices 100, 102 or after a predetermined amount of time has elapsed. In other examples, the session profile may specify that a particular state of session 40 occurs after client devices 100, 102 exhibit a particular behavior, such as exchanging certain types of packets, exchanging packets in a particular pattern or frequency, exchanging packets of a particular size or carrying a particular payload or data component, or client devices 100, 102 exchange a plurality of byte patterns. In some examples, the session profile specifies a state machine of session 40 so as to enable routing component 250 to model a behavior of session 40 and determine, based on the model, a state of session 40.

Additionally, session state policies module 122 generates multiple network policies 358. Each network policy corresponds to each respective state of each session. Further, each network policy specifies one or more performance requirements for network traffic exchanged during the respective state. For example, session state policies module 122 determines one or more performance requirements including jitter, latency, packet loss, bandwidth, or cost for a path over which network traffic associated with session 40 is to be forwarded during each state of session 40. In some examples, session state policies module 122 determines the performance requirements based on requirements set forth by an SLA for session 40. Session state policies module 122 transmits the network policies for the states of session 40 to routers 110.

For example, each state of each session may be associated with a particular type of traffic category or traffic class, such as a real-time traffic category, such as a Voice over Internet Protocol (VoIP) category, an Interactive Video category, a remote desktop category, or a gaming category or a non-real-time traffic category, such as a network management category, a streaming video category, an interactive data category, or a data transfer category. Each category of traffic may depend on different performance characteristics. Session state policies module 122 may use such classifications to define different network policies for each state of each session, thereby enabling routers 110 to use different performance requirements when performing path selection on a session-specific and session state-specific basis.

In the foregoing example, session state policies module 122 implements a machine learning system to identify the different states of each session and determines a network policy to be applied for path selection during each corresponding session state. However, in other examples, an administrator may define the states or phases of each session and select the network policy to be applied for path selection during each corresponding session state. In some examples, session state policies module 122 identifies one or more events within a session, and the administrator may select which events are indicative of a change in state of the session.

Figure 4:
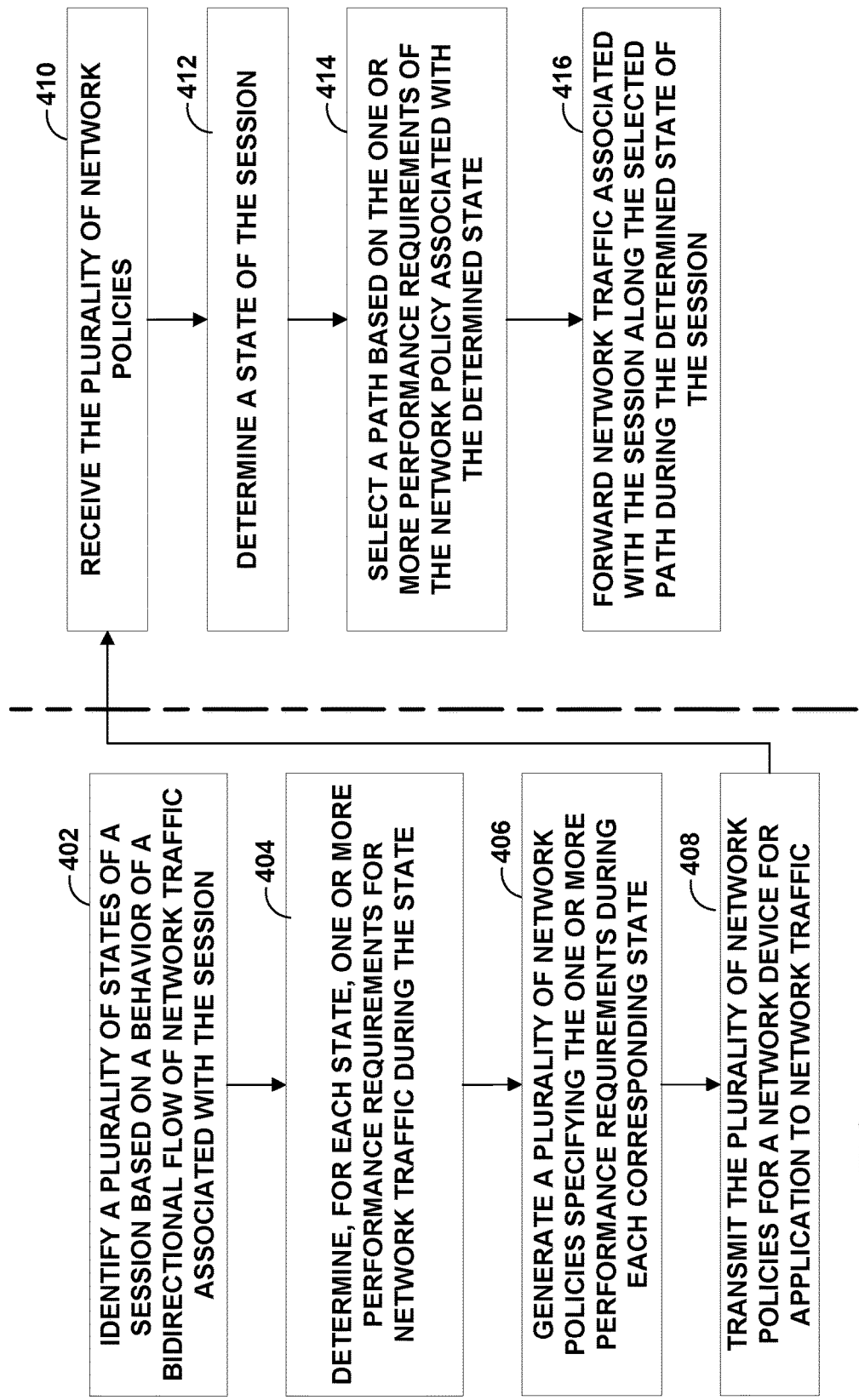
FIG. 4 is a flowchart illustrating an example operation in accordance with the techniques of the disclosure.

FIG. 4 is a flowchart illustrating an example operation in accordance with the techniques of the disclosure. FIG. 4 is described with respect to the example of FIG. 1, for convenience.

Session state policies module 122 identifies a plurality of states of session 40 based on a behavior of a bidirectional flow of network traffic associated with session 40 over a period of time (402). As described above, session 40 comprises a bidirectional flow of network traffic between client devices 100A, 102A, e.g., a forward packet flow originating from client device 100A and destined for client device 102A and a reverse packet flow originating from client device 102A and destined for client device 100A. For example, session state policies module 122 identifies the multiple states of session 40 by examining behavior of the bidirectional flow of network traffic associated with session 40 over a lifetime of session 40 (e.g., from establishment to termination of session 40). In some examples, the multiple states include a session establishment state (such as a TCP handshake or a TLS handshake), a data communication state, and a teardown state.

Session state policies module 122 determines, for each state of the plurality of states of session 40, one or more performance requirements for network traffic during the state (404). For example, session state policies module 122 determines one or more performance requirements, including jitter, latency, packet loss, bandwidth, or cost for a path over which network traffic associated with session 40 is to be forwarded during each state of session 40. In some examples, session state policies module 122 determines the performance requirements for the network traffic based on requirements set forth by an SLA for session 40. Session state policies module 122 transmits the network policies for the states of session 40 to routers 110. Session state policies module 122 generates a plurality of network policies, each network policy corresponding to a respective state of session 40 (406). Each network policy specifies the one or more performance requirements for network traffic during the corresponding state session 40. Session state policies module 122 transmits the plurality of network policies to router 110 for application to network traffic associated with session 40 (408).

Router 110 receives the plurality of network policies from session state policies module 122 (410). Each network policy defines the one or more performance requirements for network traffic during each corresponding state of session 40. In some examples, router 110 further receives information for detecting or identifying each state of session 40.

Router 110 determines a state of session 40 (412). In some examples, router 110 identifies a state change of session 40, e.g., that session 40 has changed from a first state to a second state. In some examples, router 110 determines that session 40 has changed from a session establishment state to a data communication state based on observation of a completion of a TCP handshake or TLS handshake. In some examples, router 110 determines a state of session 40 based on a number of packets exchanged between client device 100A and 102A, an elapsed time of session 40, a TCP socket setup or TCP handshake, a TLS handshake, a web request from a client device to a server, a response from a server to a client device, a form submission by a client device, a selection of a weblink or Uniform Resource Locator (URL), a TCP socket keepalive message between a server and a client device, or a TCP socket teardown message.

Router 110 selects a path based on the one or more performance requirements of the network policy associated with the state (414). For example, router 110 obtains one or more metrics for each path of a plurality of paths through network system 2. Router 110 determines that the metrics of a first path (e.g., including routers 110A and 110D-110I) satisfy the performance requirements specified by the network policy associated with the state of session 40. Router 110 forwards network traffic associated with session 40 along the selected path during the state of session 40 (416).

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

Various examples have been described. These and other examples are within the scope of the following claims.

What is claimed is:

1. A method comprising:

receiving, by a network device of a plurality of network devices forming a network, a first network policy defining one or more first performance requirements for network traffic during a session establishment state of a session and a second network policy defining one or more second performance requirements for network traffic during a data communication state of the session, wherein the session comprises a bidirectional flow of network traffic between a first client device and a second client device;

based at least in part on determining that the session is in the session establishment state, selecting, by the network device and based on the one or more first performance requirements defined by the first network policy corresponding to the session establishment state of the session, a first path of a plurality of different paths through the network;

forwarding, by the network device, network traffic associated with the session establishment state of the session along the first path;

based at least in part on determining a change in the session from the session establishment state to the data communication state, selecting, by the network device and based on the one or more second performance requirements defined by the second network policy corresponding to the data communication state of the session, a second path of the plurality of different paths, the second path different from the first path; and forwarding, by the network device, network traffic associated with the data communication state of the session along the second path.

2. The method of claim 1, further comprising:

based at least in part on determining a change in the session from the data communication state to a teardown state, selecting, by the network device and based on one or more third performance requirements defined by a third network policy corresponding to the teardown state, a third path of the plurality of different paths, the third path different from the second path; and forwarding, by the network device, network traffic associated with the teardown state of the session along the third path.

3. The method of claim 1, wherein the one or more first performance requirements comprise one or more of jitter, latency, packet loss, bandwidth, or cost.

4. The method of claim 1, wherein determining the change in the session from the session establishment state to the data communication state is based on at least one of:
 a number of packets associated with the session received by the network device;
 an elapsed time of the session; or
 a type of packet received by the network device.

5. The method of claim 1, wherein a plurality of different states of the session includes the session establishment state, the data communication state, and a teardown state.

6. The method of claim 1,
 wherein determining the session is in the session establishment state is based at least in part on receiving a packet comprising a Transmission Control Protocol (TCP) "SYN" message from the first client device; and
 wherein determining the change in the session from the session establishment state to the data communication state based at least in part on receiving a packet comprising a TCP "ACK" message from the first client device.

7. The method of claim 1,
 wherein determining the session is in the session establishment state is based at least in part on receiving a packet comprising a Transport Layer Security (TLS) "ClientHello" message from the first client device; and
 wherein determining the change in the session from the session establishment state to the data communication state is based at least in part on receiving a packet comprising a TLS "Finished" message from the first client device.

8. The method of claim 1, wherein a plurality of different states of the session includes:
 the session establishment state;
 the data communication state, and
 at least one of a real-time state, a time-sensitive state, or a time-insensitive state.

9. A network device of a plurality of network devices forming a network, the network device comprising:
 storage media; and
 processing circuitry configured to:
  receive a first network policy defining one or more first performance requirements for network traffic during a session establishment state of a session and a second network policy defining one or more second performance requirements for network traffic during a data communication state of the session, wherein the session comprises a bidirectional flow of network traffic between a first client device and a second client device;
  based at least in part on determining that the session is in the session establishment state, select, based on the one or more first performance requirements defined by the first network policy corresponding to the session establishment state of the session, a first path of a plurality of different paths through the network;
  forward network traffic associated with the session establishment state of the session along the first path;
  based at least in part on determining a change in the session from the session establishment state to the data communication state, select, based on the one or more second performance requirements defined by the second network policy corresponding to the data communication state of the session, a second path of the plurality of different paths, the second path different from the first path; and
  forward network traffic associated with the data communication state of the session along the second path.

10. The network device of claim 9, wherein the processing circuitry is further configured to:
 based at least in part on determining a change in the session from the data communication state to a teardown state, select, based on one or more third performance requirements defined by a third network policy corresponding to the teardown state, a third path of the plurality of different paths, the third path different from the second path; and
 forward network traffic associated with the teardown state of the session along the third path.

11. The network device of claim 9, wherein the one or more first performance requirements comprise one or more of jitter, latency, packet loss, bandwidth, or cost.

12. The network device of claim 9, wherein the processing circuitry is configured to determine the change in the session from the session establishment state to the data communication state based on a number of packets associated with the session received by the network device.

13. The network device of claim 9, wherein the processing circuitry is configured to determine the change in the session from the session establishment state to the data communication state based on an elapsed time of the session.

14. The network device of claim 9, wherein the processing circuitry is configured to determine the change in the session from the session establishment state to the data communication state based on a type of packet received by the network device.

15. The network device of claim 9, wherein a plurality of different states of the session includes the session establishment state, the data communication state, and a teardown state.

16. The network device of claim 9,
 wherein the processing circuitry is configured to determine the session is in the session establishment state based at least in part on receiving a packet comprising a Transport Layer Security (TLS) "ClientHello" message from the first client device; and
 wherein the processing circuitry is configured to determine the change in the session from the session establishment state to the data communication state to based at least in part on receiving a packet comprising a TLS "Finished" message from the first client device.

17. The network device of claim 9, wherein a plurality of different states of the session includes:
 the session establishment state;
 the data communication state, and
 at least one of a real-time state, a time-sensitive state, or a time-insensitive state.

18. The network device of claim 10, wherein the processing circuitry is configured to determine the change in the session from the data communication state to the teardown state based on receiving at least one of:
 a packet comprising a TLS "Close Notify" message from the first client device or the second client device; or
 a packet comprising a TCP "FIN" message from the first client device or the second client device.

19. The network device of claim 9,
wherein, to determine the change in the session from the session establishment state to the data communication state, the processing circuitry is configured to determine an impending change in the session from the session establishment state to the data communication state; and
wherein the processing circuitry is configured to proactively forward network traffic associated with session along the second path prior to the change in the session from the session establishment state to the data communication state.

20. Non-transitory, computer-readable media comprising instructions that, when executed, are configured to cause processing circuitry to:
receive a first network policy defining one or more first performance requirements for network traffic during a session establishment state of a session and a second network policy defining one or more second performance requirements for network traffic during a data communication state of the session, wherein the session comprises a bidirectional flow of network traffic between a first client device and a second client device;
based at least in part on determining that the session is in the session establishment state, select, based on the one or more first performance requirements defined by the first network policy corresponding to the session establishment state of the session, a first path of a plurality of different paths through a network formed by a plurality of network devices;
forward network traffic associated with the session establishment state of the session along the first path;
based at least in part on determining a change in the session from the session establishment state to the data communication state, select, based on the one or more second performance requirements defined by the second network policy corresponding to the data communication state of the session, a second path of the plurality of different paths, the second path different from the first path; and
forward network traffic associated with the data communication state of the session along the second path.

* * * * *